(12) United States Patent
Yamaguchi et al.

(10) Patent No.: US 12,094,067 B2
(45) Date of Patent: Sep. 17, 2024

(54) MACHINE FASTENING WORK METHOD USING AUGMENTED REALITY

(71) Applicant: HITACHI, LTD., Tokyo (JP)

(72) Inventors: Gojiro Yamaguchi, Tokyo (JP); Shogo Nakata, Kyoto (JP); Yusuke Hirai, Kyoto (JP); Na Yang, Tokyo (JP); Yuta Tanida, Tokyo (JP); Norihisa Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 125 days.

(21) Appl. No.: 17/908,957

(22) PCT Filed: Mar. 5, 2020

(86) PCT No.: PCT/JP2020/009378
§ 371 (c)(1),
(2) Date: Sep. 2, 2022

(87) PCT Pub. No.: WO2021/176645
PCT Pub. Date: Sep. 10, 2021

(65) Prior Publication Data
US 2023/0104917 A1  Apr. 6, 2023

(51) Int. Cl.
*G06T 19/00* (2011.01)
*G02B 27/01* (2006.01)

(52) U.S. Cl.
CPC ...... *G06T 19/006* (2013.01); *G02B 2027/014* (2013.01)

(58) Field of Classification Search
CPC .............................. G06T 19/006; B25B 23/14
See application file for complete search history.

(56) References Cited

U.S. PATENT DOCUMENTS

| | | | |
|---|---|---|---|
| 2017/0197302 A1* | 7/2017 | Kobayashi | ............ B25B 13/463 |
| 2018/0158247 A1 | 6/2018 | Koyanaka | |
| 2023/0326096 A1* | 10/2023 | Yoshii | ..................... G06T 11/00 |
| | | | 345/633 |

FOREIGN PATENT DOCUMENTS

| | | |
|---|---|---|
| JP | 5065851 B2 | 11/2012 |
| JP | 2016-189122 A | 11/2016 |

(Continued)

OTHER PUBLICATIONS

English translation of KR 101990284 B1 (Year: 2019).*

(Continued)

*Primary Examiner* — Samantha (Yuehan) Wang
(74) *Attorney, Agent, or Firm* — MATTINGLY & MALUR, PC

(57) ABSTRACT

In a mechanical fastening work method in an augmented reality space, a mechanical fastening part and a mechanical fastening part virtual body correspond one-to-one, and a tool and a tool virtual body correspond one-to-one. An augmented reality configuration system generates an augmented reality space including: a camera that captures a real space; a server that analyzes an image captured by the camera and generates the augmented reality space; and a tool that acquires torque information observed when tightening or loosening the mechanical fastening part and transmits and receives the torque information to and from the server. The mechanical fastening work method includes a step of, when the tool detects torque information that the mechanical fastening part is to be tightened or loosened, defining the mechanical fastening part virtual body corresponding one-to-one to the mechanical fastening part, and making the defined mechanical fastening part virtual body appear in the virtual space.

13 Claims, 25 Drawing Sheets

(56) References Cited

FOREIGN PATENT DOCUMENTS

| | | |
|---|---|---|
| JP | 2017-107349 A | 6/2017 |
| JP | 2018-092476 A | 6/2018 |
| JP | 2018-101366 A | 6/2018 |
| KR | 10-1990284 B1 | 6/2019 |
| KR | 101990284 B1 * | 6/2019 |

OTHER PUBLICATIONS

KR 101990284 B1 (Year: 2019).*
He et al., A VR-based Complex Equipment Maintenance Training System, 978-1-7281-4094-0/19/$31.00 © 2019 IEEE, pp. 1711-1716 (Year: 2019).*
A VR-based Complex Equipment Maintenance Training System (Year: 2019).*
Taiwanese Office Action received in corresponding TW Application 110107703 dated Jun. 28, 2022.
International Search Report of PCT/JP2020/009378 dated Aug. 4, 2020.
Extended European Search Report received in corresponding European Application No. 20923401.2 dated Sep. 28, 2023.

* cited by examiner

FIG. 3

WORK INSTRUCTION DOCUMENT 360

| No. | ITEM | CONTENT |
|---|---|---|
| 1 | DRAWING NUMBER | ○○-△□○△ |
| 2 | DRAWING NAME | ASSEMBLY DRAWING FOR ATTACHING COMPONENT TO SUBSTRATE |
| 3 | COMPONENT NAME, MATERIAL | BASE (RD1), ALUMINUM ALLOY |
| 4 | COMPONENT NAME, MATERIAL | COMPONENT (RD2), ALUMINUM ALLOY |
| 5 | BOLT SIZE | M12 |
| 6 | BOLT UNDERHEAD LENGTH | 50mm |
| 7 | BOLT MATERIAL | STAINLESS STEEL |
| 8 | PRESCRIBED FASTENING TORQUE | 20 (LOWER-LIMIT VALUE), 30 (TARGET VALUE), 40 (UPPER-LIMIT VALUE)   [N·m] |
| 9 | NUMBER OF BOLTS | 4 |
| 10 | TOOL (RTn) | $D1n = aa$ (mm) |
| 11 | SOCKET (RTSn) | RB1,RB2,RB4: $D21 = 50$ (mm), RB3: $D22 = 80$ (mm) |

FIG. 14

DATA TABLE FOR RECORDING BOLT FASTING WORK BY FIRST WORKER

| No. | X | Y | Z | i | j | k | Tr_Min [Nm] | Tr_Set [Nm] | Tr_Max [Nm] | Tr_rslt [Nm] | ORDER (Seq) | WORK DATE | WORK TIME |
|-----|---|---|---|---|---|---|-------------|-------------|-------------|--------------|-------------|-----------|-----------|
| RB1 |   |   |   |   |   |   | 20 | 30 | 40 |   |   |   |   |
| RB2 |   |   |   |   |   |   | 20 | 30 | 40 |   |   |   |   |
| RB3 |   |   |   |   |   |   | 20 | 30 | 40 |   |   |   |   |
| RB4 |   |   |   |   |   |   | 20 | 30 | 40 |   |   |   |   |

BOLT POSITION COORDINATES

BOLT POSITION DIRECTION (DIRECTION FOR DIRECTION VECTOR NV) SEEN FROM TOOL REFERENCE PLANE

FASTENING TORQUE LOWER LIMIT, TARGET, UPPER LIMIT, RESULT, AND FASTENING ORDER

DATE AND TIME AT WHICH FASTENING WORK HAS BEEN PERFORMED

FIG. 17

DATA TABLE IN WHICH IS RECORDED BOLT FASTING WORK BY FIRST WORKER

| No. | X | Y | Z | i | j | k | Tr_Min [Nm] | Tr_Set [Nm] | Tr_Max [Nm] | Tr_rslt [Nm] | ORDER (Seq) | WORK DATE | WORK TIME |
|---|---|---|---|---|---|---|---|---|---|---|---|---|---|
| RB1 | x1 | y1 | z1 | i1 | j1 | k1 | 20 | 30 | 40 | 32.5 | 1 | 2020/02/03 | 13:25:47 |
| RB3 | x3 | y3 | z3 | i3 | j3 | k3 | 20 | 30 | 40 | 28.9 | 2 | 2020/02/03 | 13:26:22 |
| RB2 | x2 | y2 | z2 | i2 | j2 | k2 | 20 | 30 | 40 | 31.3 | 3 | 2020/02/03 | 13:28:01 |
| RB4 | x4 | y4 | z4 | i4 | j4 | k4 | 20 | 30 | 40 | 33.2 | 4 | 2020/02/03 | 13:28:45 |

BOLT POSITION COORDINATES

COORDINATES FOR DIRECTION VECTOR NV HAVING AS START POINT REPRESENTATIVE POINT OITm FOR TOOL VIRTUAL BODY ITm

FASTENING TORQUE LOWER LIMIT, TARGET, UPPER LIMIT, RESULT, AND FASTENING ORDER

DATE AND TIME AT WHICH FASTENING WORK HAS BEEN PERFORMED

FIG. 19

DATA TABLE FOR RECORDING BOLT FASTENING WORK BY SECOND WORKER

| No. | X | Y | Z | i | j | k | Tr_Min [Nm] | Tr_Set [Nm] | Tr_Max [Nm] | Tr_rslt [Nm] | ORDER (Seq) | WORK DATE | WORK TIME |
|---|---|---|---|---|---|---|---|---|---|---|---|---|---|
| RB1 | x1 | y1 | z1 | i1 | j1 | k1 | 20 | 30 | 40 | | 1 | | |
| RB3 | x3 | y3 | z3 | i3 | j3 | k3 | 20 | 30 | 40 | | 2 | | |
| RB2 | x2 | y2 | z2 | i2 | j2 | k2 | 20 | 30 | 40 | | 3 | | |
| RB4 | x4 | y4 | z4 | i4 | j4 | k4 | 20 | 30 | 40 | | 4 | | |

BOLT POSITION COORDINATES

COORDINATES FOR DIRECTION VECTOR NV HAVING AS START POINT REPRESENTATIVE POINT OITm FOR TOOL VIRTUAL BODY ITm

FASTENING TORQUE LOWER LIMIT, TARGET, UPPER LIMIT, RESULT, AND FASTENING ORDER

DATE AND TIME AT WHICH FASTENING WORK HAS BEEN PERFORMED

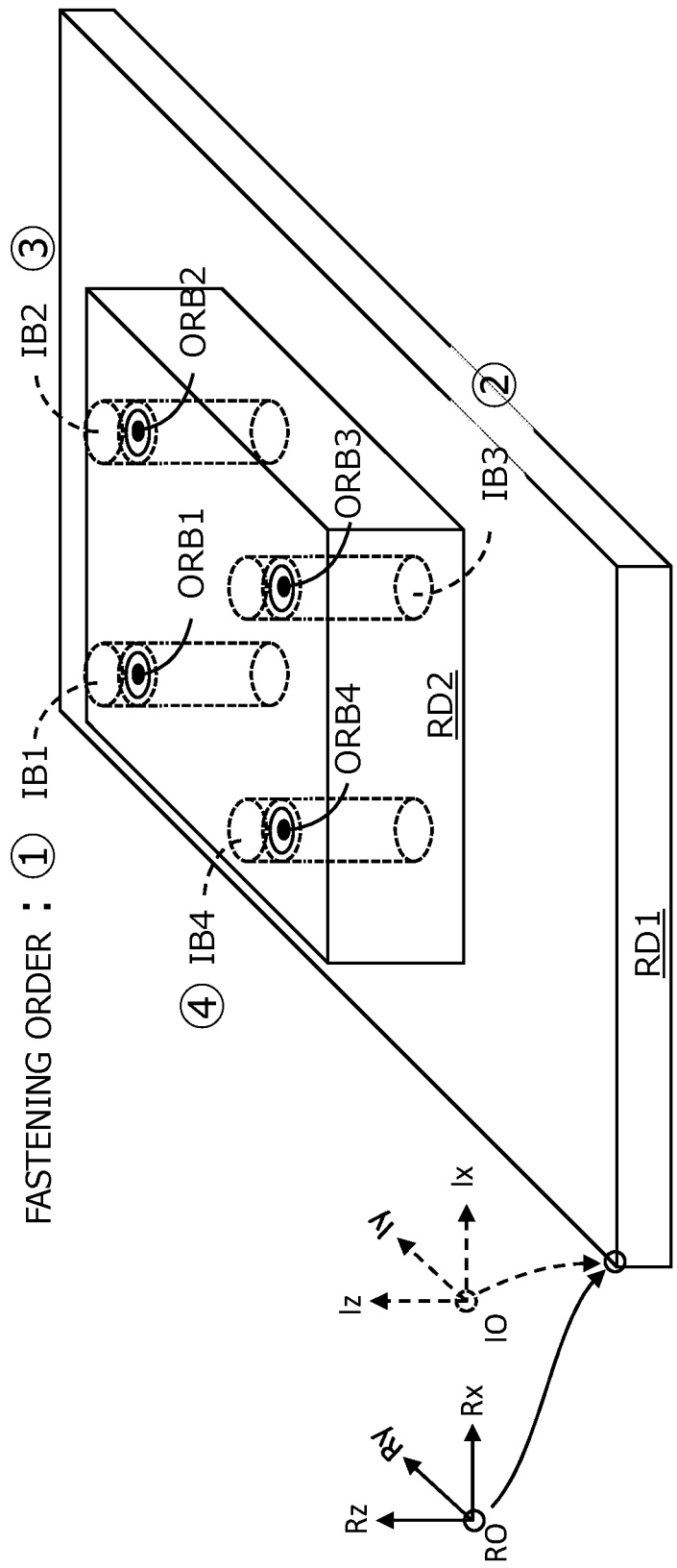

FIG. 23

DATA TABLE IN WHICH IS RECORDED BOLT FASTING WORK BY SECOND WORKER

| No. | X | Y | Z | i | j | k | Tr_Min [Nm] | Tr_Set [Nm] | Tr_Max [Nm] | Tr_rslt [Nm] | ORDER (Seq) | WORK DATE | WORK TIME |
|---|---|---|---|---|---|---|---|---|---|---|---|---|---|
| RB1 | x1 | y1 | z1 | i1 | j1 | k1 | 20 | 30 | 40 | 33.2 | 1 | 2020/02/05 | 13:10:25 |
| RB3 | x3 | y3 | z3 | i3 | j3 | k3 | 20 | 30 | 40 | 35.6 | 2 | 2020/02/05 | 13:12:02 |
| RB2 | x2 | y2 | z2 | i2 | j2 | k2 | 20 | 30 | 40 | 27.8 | 3 | 2020/02/05 | 13:14:36 |
| RB4 | x4 | y4 | z4 | i4 | j4 | k4 | 20 | 30 | 40 | 26.3 | 4 | 2020/02/05 | 13:18:00 |

BOLT POSITION COORDINATES

BOLT POSITION DIRECTION (DIRECTION FOR DIRECTION VECTOR NV) SEEN FROM TOOL REFERENCE PLANE

FASTENING TORQUE LOWER LIMIT, TARGET, UPPER LIMIT, RESULT, AND FASTENING ORDER

DATE AND TIME AT WHICH FASTENING WORK HAS BEEN PERFORMED

MACHINE FASTENING WORK METHOD USING AUGMENTED REALITY

TECHNICAL FIELD

The present invention pertains to a mechanical fastening work method that uses augmented reality.

BACKGROUND ART

Augmented Reality (Augmented Reality) is (an augmented reality space) technique for augmenting a space perceived by a person by overlapping a virtual space constructed by a technique such as 3D-CAD data or CG (Computer Graphics) configured by a server (computer), etc., on a real space perceived by the person or a camera.

In the past, a work management system that ensures traceability by associating information pertaining to fastening for a bolt, a flange, etc. obtained via a tool or a measuring instrument with tool and measuring instrument data used in work or ID information for workers, etc. to thereby realize high-quality work management is known (for example, refer to Patent Document 1).

Note that traceability (may also be referred to as "traceability") means being able to track the distribution channel for an article from a production stage to a final consumption stage or a disposal stage.

PRIOR ART DOCUMENT

Patent Document

Patent Document 1: Japanese Patent No. 5065851

SUMMARY OF INVENTION

Problems to be Solved by the Invention

The work management system described in Patent Document 1 can, regarding each item of bolt fastening work data pertaining to flange fastening, ensure traceability for fastening tools, measuring instruments, bolts used, etc. for which this bolt fastening work data is set and measured, and can prevent an input error for a target value for a set fastening torque or a target value for a set fastening margin due to a human-caused error or a writing-down error for a measured fastening torque value or a measured fastening margin.

However, for the work management system described in Patent Document 1, all bolts pertaining to flange fastening need to be provided with an RFIC tag. Furthermore, in order to transmit and receive information from RFIC tags provided for these bolts, it is necessary to prepare a fastening tool that has an antenna that extends to a head section for grasping these bolts, and thus there is a concern that an operating cost therefor will increase.

Accordingly, an objective of the present invention is to provide a high-quality mechanical fastening work method that has a low operating cost, does not require adding an identification mark such as an RFIC tag to a fastening part or transmitting or receiving data between the fastening part and a fastening tool, and uses augmented reality such that a certain worker records content for performed mechanical fastening work to ensure traceability, whereby handover to another worker, for example, is accelerated.

Means for Solving the Problems

In order to solve the problems described above, one representative mechanical fastening work method according to the present invention is mechanical fastening work method, by a first worker, using an augmented reality space generated by overlapping a virtual space on real space, the real space including a mechanical fastening part and a tool put on the mechanical fastening part, the virtual space including a mechanical fastening part virtual body simulating the mechanical fastening part and a tool virtual body simulating the tool virtual body, in the augmented reality space, the mechanical fastening part corresponding one-to-one to the mechanical fastening part virtual body and the tool corresponding one-to-one with the tool virtual body, an augmented reality system that generates the augmented reality space having a camera that captures the real space, a server that is connected to the camera and is configured to analyze an image captured by the camera and generate an augmented reality space, and the tool that obtains tightening/loosening information observed at a time of tightening or loosening for the mechanical fastening part and transmits and receives the tightening/loosening information to and from the server, the mechanical fastening work method including: a step of defining the mechanical fastening part virtual body that corresponds one-to-one to the mechanical fastening part virtual body, and having the defined mechanical fastening part virtual body appear in the virtual space, when the tool has detected the tightening/loosening information for tightening or loosening the mechanical fastening part.

Advantages of the Invention

By virtue of the present invention, it is possible to provide a mechanical fastening work method that has a low operating cost and is high quality, does not require adding an identification mark such as an RFIC tag to a fastening part or transmitting or receiving data between the fastening part and a fastening tool, and uses augmented reality such that a certain worker records content for performed mechanical fastening work to ensure traceability, whereby handover to another worker, for example, is accelerated.

Problems, configurations, and effects apart from the above will be clarified by the following description of embodiments.

BRIEF DESCRIPTION OF THE DRAWINGS

FIG. 3 is a view that illustrates an example of a work instruction document for giving instruction on work to attach a component to a base, according to an embodiment of the present invention.

FIG. 14 is a data table that is for recording bolt fastening work by a first worker and is for before the bolt fastening work, according to an embodiment of the present invention.

FIG. 17 is a data table that is for recording bolt fastening work by a first worker and is for after the bolt fastening work, according to an embodiment of the present invention.

FIG. 19 is a work instruction document (work manual) that is for giving instruction on fastening work to a second worker and has been created on the basis of the fastening work by the first worker, according to an embodiment of the present invention.

FIG. 20 is a schematic view that illustrates positions for bolts to be fastened by the second worker, and is an image of an augmented reality space displayed by a transmissive screen for the second worker, according to an embodiment of the present invention.

FIG. 23 is a data table that is for recording bolt fastening work by the second worker and is for after the bolt fastening work, according to an embodiment of the present invention.

MODES FOR CARRYING OUT THE INVENTION

Embodiments of the present invention are described below with reference to the drawings. Note that the present invention is not limited by these embodiments. In the description of the drawings, the same portions are illustrated by applying the same reference symbol.

As described above, the present invention pertains to a method that uses augmented reality to record work content pertaining to mechanical fastening in which a worker fastens or loosens a bolt, etc., output a work instruction such that content in which work has been performed by a certain worker can be performed by another worker, and make it possible to easily confirm and save the fact that the work content, for which the work instruction has been made, has been reliably performed.

Real space in the present specification means a space in which is placed an image that worker obtains through their own vision or an image captured by a camera 10. In addition, a virtual space in the present specification means a space that is inside a server (computer) and is constructed with digital information such as 3D-CAD or CG.

In addition, mechanical fastening in the present specification includes fastening using a hexagon-headed bolt, fastening using a hexagon socket bolt, fastening using a rivet, etc. A mode for working the present invention is described by giving fastening using a hexagon-headed bolt as an example.

<System Configuration>

Figure 1:
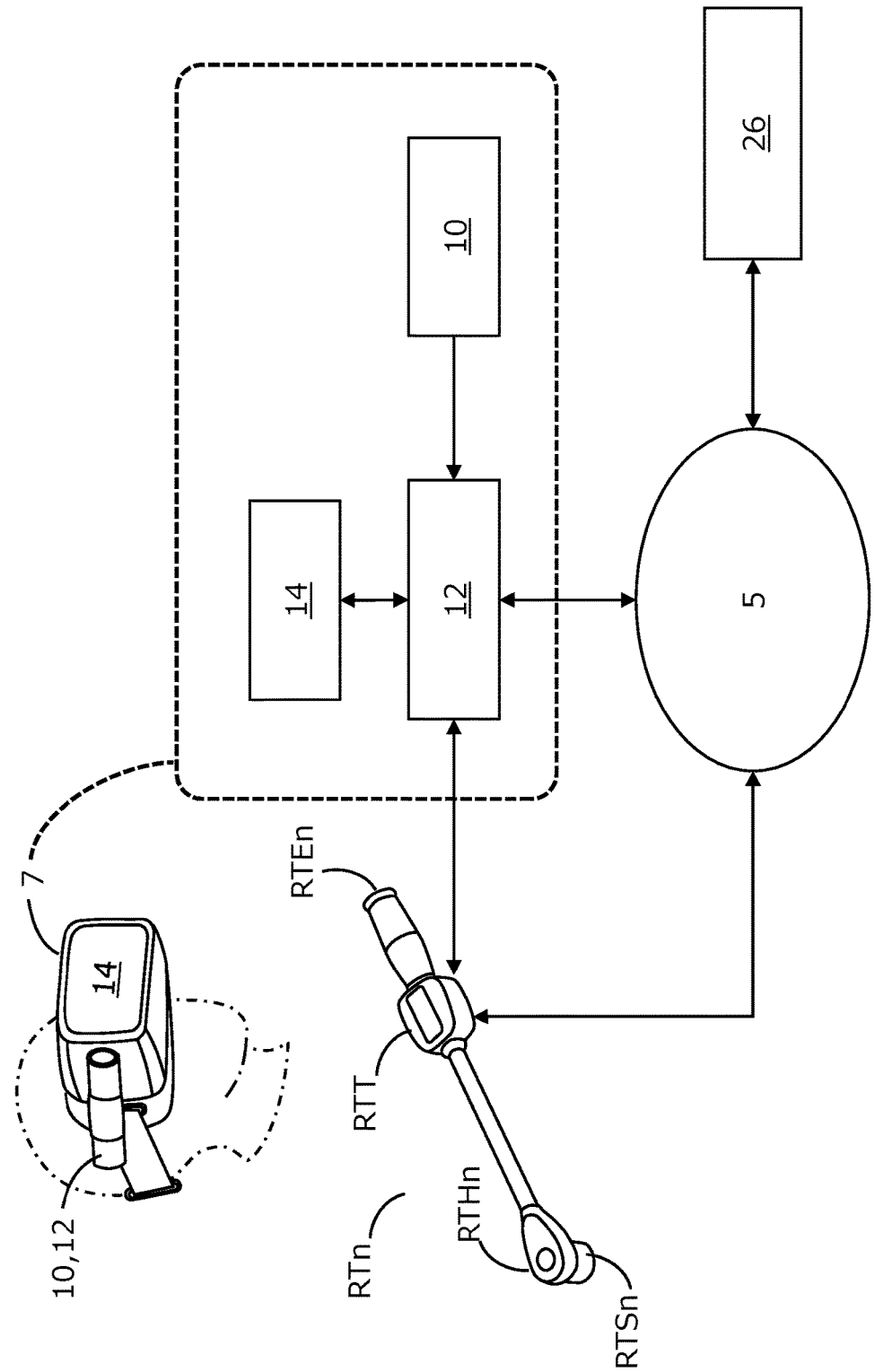
FIG. 1 is a schematic view of a system configuration corresponding to a mechanical fastening work method using augmented reality, according to an embodiment of the present invention.

Firstly, with reference to FIG. 1, description is given regarding a system configuration corresponding to a mechanical fastening work method using augmented reality, according to an embodiment of the present invention.

FIG. 1 is a schematic view of a configuration of a system 100 that pertains to a mechanical fastening work method using augmented reality. This system 100 is configured from a wearable apparatus 7 that a worker wears, a tool RTn having a communication function that can transmit and receive torque information, etc., a network server 26 for storing a design drawing, a work instruction document, etc., and a network 5 to which various devices, etc. described above are connected.

[Wearable Apparatus 7]

The wearable apparatus 7 is a device that a worker wears. In a case where this wearable apparatus 7 is, for example, a device that a worker mounts to their head, this wearable apparatus 7 is referred to as headgear, etc. The wearable apparatus 7 is configured from the camera 10 that obtains a video from the viewpoint of the worker, an augmented reality server 12 that has functionality for performing image processing on an image, etc. captured by the camera 10 and communicating with the network 5, and a transmissive screen (transmissive screen) 14 that forms a field of view for the worker.

The transmissive screen 14 provided in the wearable apparatus 7 is provided with transparency such that it is possible to ensure the worker's field of view. The camera 10 can capture an image that is approximately the same as an image that the worker captures by vision through the transmissive screen 14. The augmented reality server 12 can project, onto the transmissive screen 14, a video of an augmented reality space resulting from overlapping an image of a virtual space created by the augmented reality server 12 onto a video of the real space captured by the camera 10.

The augmented reality server 12 provided in the wearable apparatus 7 is a computer that has a memory region for storing application software for creating an augmented reality or various items of data, a processing unit for processing request items that the worker indicates via the wearable apparatus 7, and a communication unit for transmitting and receiving data to and from the network 5.

The augmented reality server 12 is provided with functionality for performing image analysis on real space (entity) information captured by the camera 10 to thereby generate, and cause to appear in a virtual space, a tool virtual body ITm corresponding to a later-described tool RTn and socket RTSn, a bolt virtual body IBn corresponding to a bolt RBn, etc., create an augmented reality space resulting from overlapping an object caused to appear in the virtual space in the real space, or determine interference (contact) between the tool virtual body ITm and the bolt virtual body IBn in the virtual space.

When the worker performs bolt fastening work, the augmented reality server 12 obtains and stores, for example, position information for each bolt or direction information indicating a direction in which a bolt is positioned, with a tool as a starting point. For example, the augmented reality server 12 may obtain and store data regarding a fastening order, a fastening lower-limit torque, a fastening target torque, and a fastening upper-limit torque which are taught to a worker and are used when tightening each bolt, or information such as a fastening complete torque observed when a worker actually fastens a bolt or a fastening datetime.

Furthermore, the augmented reality server 12 may be provided with functionality for saving work content by a first worker, creating a work manual to be provided when teaching the work content by the first worker to a second worker, displaying the work manual to the transmissive screen 14 to thereby instruct the second worker on the work content, and additionally obtaining and storing a fastening work result by the second worker (information such as a fastening complete torque and a work datetime).

In addition, the augmented reality server 12 may obtain, via the network 5, any information stored in the network server 26, and notify the worker of information by projecting to the transmissive screen 14.

Note that the augmented reality server 12 may be configured integrally with the camera 10 or, via the network 5, the memory region or the processing unit held by the augmented reality server 12 may be provided at a location separated from the wearable apparatus 7.

[Tool RTn]

A tool RTn is a tool for tightening or loosening a mechanical fastening part such as a bolt, a screw, or a rivet. There are cases below where an operation for fastening or loosening these mechanical fastening parts is written as "tightening/loosening."

Note that the "n" in this tool RTn is a suffix indicating that there is a plurality of types prepared in accordance with a type for each intended use of a tool, a size of a mechanical fastening part such as a bolt, etc. In addition, for the convenience of the description in the present specification, a case where a mechanical fastening part is a bolt or a rivet is exemplified, but a mechanical fastening part according to the present invention is not limited to this, and may be any fastener such as a nail or a dowel.

The tool RTn has: a tool handle section RTEn which includes a gripping section grasped by a worker; a tool head section RTHn connected to the tool handle section RTEn; and a communication display unit RTT that transmits to and receives from the network 5 tightening/loosening information resulting from the tool RTn tightening or loosening a mechanical fastening part and displays information pertaining to tightening/loosening to a worker.

In the case where the mechanical fastening part is a bolt or a screw, the tightening/loosening information is fastening torque information (that includes time history data for when a fastening torque arises, etc.) for from a fastening start time until a fastening complete time which are observed when tightening a bolt (screw) RBn, or residual torque information measured when loosening a bolt that has been already fastened.

In addition, in the case where a mechanical fastening part is a rivet, the tightening/loosening information may be information regarding a time when a shaft, for a rivet grasped by a riveter that hits the rivet, broke.

In the case where a mechanical fastening part is a bolt, the tool head section RTHn may be a torque wrench for which it is possible to mount various types of sockets RTSn corresponding to a bolt size or bolt type to the head section RTHn of the tool RTn, or may have various torque wrench shapes such as a spanner shape or an adjustable wrench shape. In addition, in a case where a mechanical fastening part is a rivet, the tool head section RTHn may be a site that includes a nose housing for grasping the rivet.

A display section in the communication display unit RTT which is also provided in the tool RTn is provided with functionality for teaching a fastening target torque value (Tr_Set) to a worker, and communicating to the worker information that the worker has fastened a bolt at greater than or equal to a target torque value (Tr_Set) and less than or equal to a fastening upper-limit torque value (Tr_Max), information that fastening work has completed with a predetermined fastening torque value, etc. It is also possible to have a configuration in which these items of information are, for example, displayed on the transmissive screen 14 or displayed by a display unit in a different wearable terminal equipped to a wrist, etc. of a worker.

In addition, in a case where the mechanical fastening part is a rivet, the communication display unit RTT may be configured to connect to a nose housing that grasps the rivet, and transmit and receive an on/off signal for a trigger provided in a handle corresponding to the tool handle section RTEn.

[Network Server 26]

The network server 26 is a server for storing a production work instruction document in which production content for a product (a railway vehicle, an automobile, etc.) is described, a maintenance work instruction document in which content for maintenance work is described, etc. In addition, the network server 26 is provided with functionality for, in response to a request by the augmented reality server 12, extracting only necessary data from stored data and providing the necessary data to the augmented reality server 12.

In addition, the network server 26 is provided with functionality for performing image analysis such as edge processing on an image of a base and a component (for example, a base RD1 and a component RD2 illustrated in FIG. 2), the tool RTn, the socket RTSn, etc., the image having been captured by the camera 10, to thereby extract a feature point from a fastening target object, allocate a real-space origin RO (0, 0, 0) to this feature point, and, in a virtual space corresponding to real space, generate a virtual-space origin IO (0, 0, 0) which corresponds one-to-one to the real-space origin.

Note that the image analysis here may be any technique, such as a Canny method, a second-order technique, threshold processing, continuous processing, or processing using a convolutional neural network.

In addition, the network server 26 is provided with functionality for analyzing an image captured by the camera 10, obtaining dimension information such as the main dimensions for the tool RTn, the socket RTSn, etc., obtaining position information (for example, coordinates indicating a three-dimensional position) in real space for the tool RTn, the socket RTSn, etc., and transcribing the real space position information and dimension information to the virtual space, based on the virtual-space origin IO which corresponds one-to-one to the real-space origin RO.

In addition, it is possible for the network server 26 to have a configuration for performing image analysis on a marker such as a QR code (registered trademark) attached to the tool RTn, the socket RTSn, etc., and reading information stored in the marker to therefore obtain the dimension information or position information described above.

Note that some or practically all functionality (processing) in the above-described augmented reality server 12 may be replaced by functionality (processing) in the network server 26. Accordingly, for the convenience of description in the following description, functionality (processing) in the augmented reality server 12 is not distinguished from functionality (processing) in the network server 26, and functionality (processing) in either the augmented reality server 12 or the network server 26 is simply described as server functionality (processing).

In addition, as described above, a mechanical fastening part is a bolt, screw, rivet, etc. but an embodiment is described below by giving a rivet as an example of a representative mechanical fastening part.

<Work Content>

Figure 2:
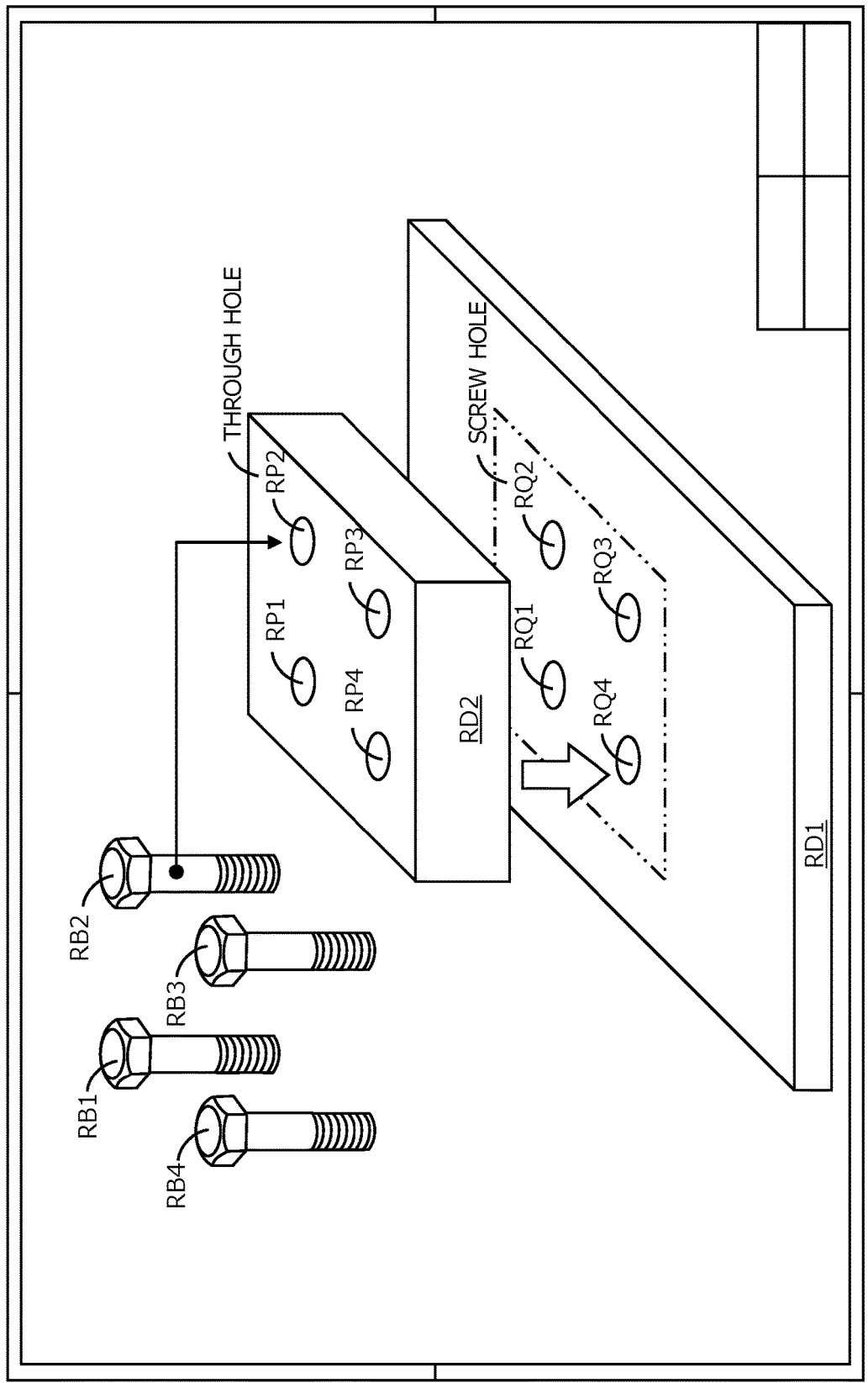
FIG. 2 is an assembly drawing that illustrates assembly work in the mechanical fastening work method using augmented reality, according to an embodiment of the present invention.

Next, with reference to FIG. 2, description is given regarding assembly work in a mechanical fastening work method using augmented reality, according to an embodiment of the present invention.

FIG. 2 is an assembly drawing that illustrates an example of assembly work 200 in the mechanical fastening work method using augmented reality, according to an embodiment of the present invention. The assembly work 200 is work for, in real space, securing the component RD2 illustrated in FIG. 2 by four bolts RB1 to RB4 (hereinafter written as RBn (n=1 to 4) or simply as RBn) to the base RD1. This base RD1 has threaded holes RQ1 to RQ4, which have thread grooves for the bolts RBn having penetrated the component RD2 to screw into. In addition, the component RD2 is provided with, at the four corners thereof, through holes RP1 to RP4 through which the bolts RBn penetrate in a vertical direction.

Next, with reference to FIG. 3, description is given regarding a work instruction document for giving instruction on work to attach a component to a base, according to an embodiment of the present invention.

FIG. 3 is a view that illustrates an example of a work instruction document 360 for giving instruction on work to attach a component to a base. As illustrated in FIG. 3, for example information such as a drawing number, a drawing name, a component name, a material, a bolt size, a bolt underhead length, a bolt material, prescribed fastening torque values (such as a lower-limit value, a target value, or an upper-limit value), the number of bolts, tool and socket types, etc. is managed in the work instruction document 360. In a case where information such as a bolt position or an obstacle near or in front of a bolt is obtained in advance, correspondence between a bolt RBn and a socket RTSn used for the bolt RBn may be written in the work instruction document 360 illustrated in FIG. 3.

Note that, FIG. 3 exemplifies a case in which, for sockets used for the fastening work illustrated in FIG. 2, the bolts RB1, RB2, and RB4 are fastened by a socket RTS1 having a socket length (D21) of 50 mm, and the bolt RB3 is fastened by a socket RTS2 having a socket length (D22) of 80 mm.

<Definition of Representative Point that Indicates Bolt Position>

Figure 4:
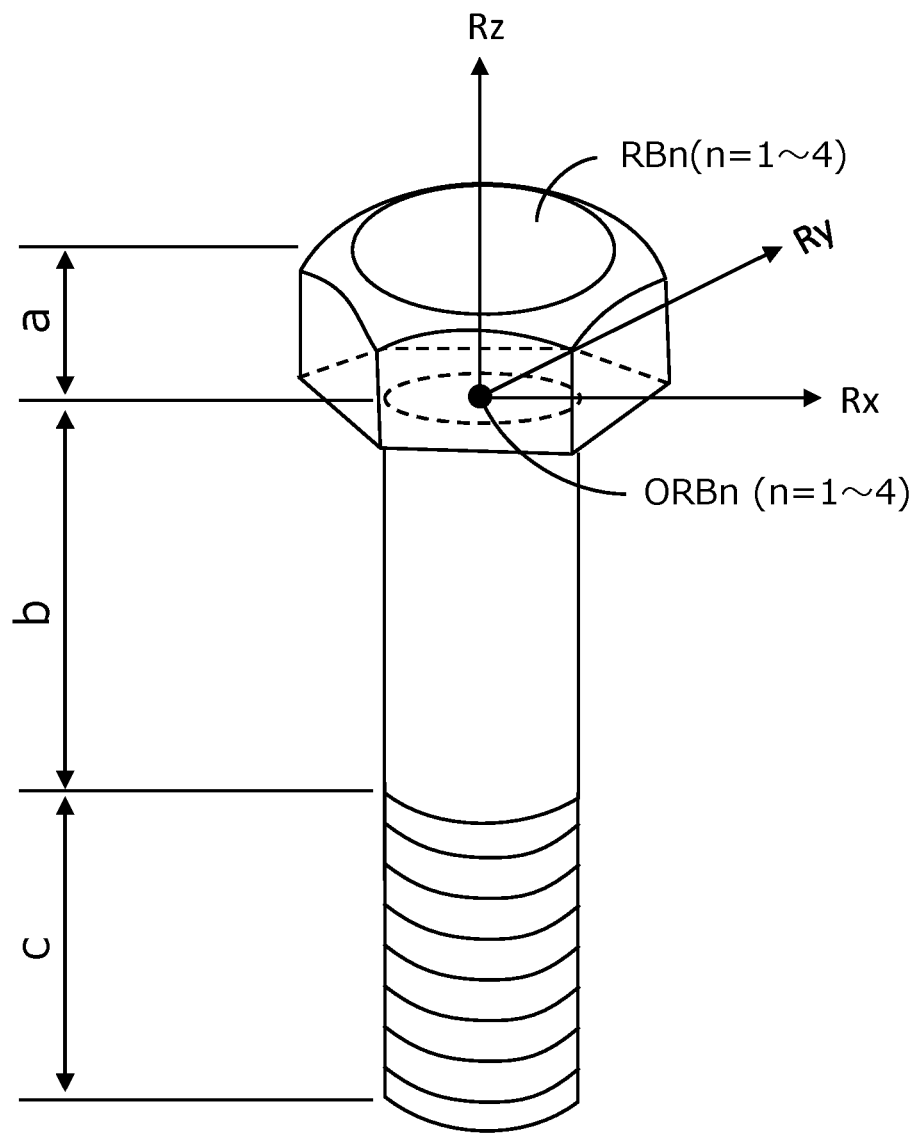
FIG. 4 is a schematic view that illustrates a representative point for representing a position of a bolt used in mechanical fastening work, according to an embodiment of the present invention.

Next, with reference to FIG. 4, description is given regarding a representative point for representing a position of a bolt used in mechanical fastening work, according to an embodiment of the present invention.

FIG. 4 is a schematic view that illustrates a representative point for representing a position of a bolt used in mechanical fastening work. With a hexagon-headed bolt given as an example, the position of a representative point that represents the position of a bolt used in mechanical fastening work is described. The hexagon-headed bolt includes a head section a that is covered by the socket RTSn, a cylindrical section b that is connected to the head section a, and a threaded section c that is connected to the cylindrical section b. A bolt position (coordinates) ORBn that indicates the position of a bolt RBn is a point where a plane that connects the head section a and the cylindrical section b with each other intersects with an axis Rz for the bolt RBn.

The bolt position ORBn that indicates the position of the bolt RBn in real space described above corresponds one-to-one with a virtual bolt position OIBn that indicates the position of a virtual bolt IBn formed in a virtual space.

Subsequently, in a case where a bolt virtual body IBn is displayed overlapped in a bolt hole RPn in the component RD1 in a state where the bolt RBn has not been inserted in real space (augmented reality space, refer to FIG. 14), the position OIBn for the bolt virtual body IBn is displayed on the surface of the component RD1, and an effect by which a worker can easily understand a state in which the bolt RBn has been applied.

Note that, although the manner of defining a bolt position is described by giving a hexagon-headed bolt as an example, even in a case of a hexagon socket bolt or a screw in place of a hexagon-headed bolt, it is possible to achieve a similar effect if a representative position indicating the position of a bolt is made to be the position described above.

<Description for Positional Relation Between Tool, Socket, and Bolt in Fastening State>

Figure 5:
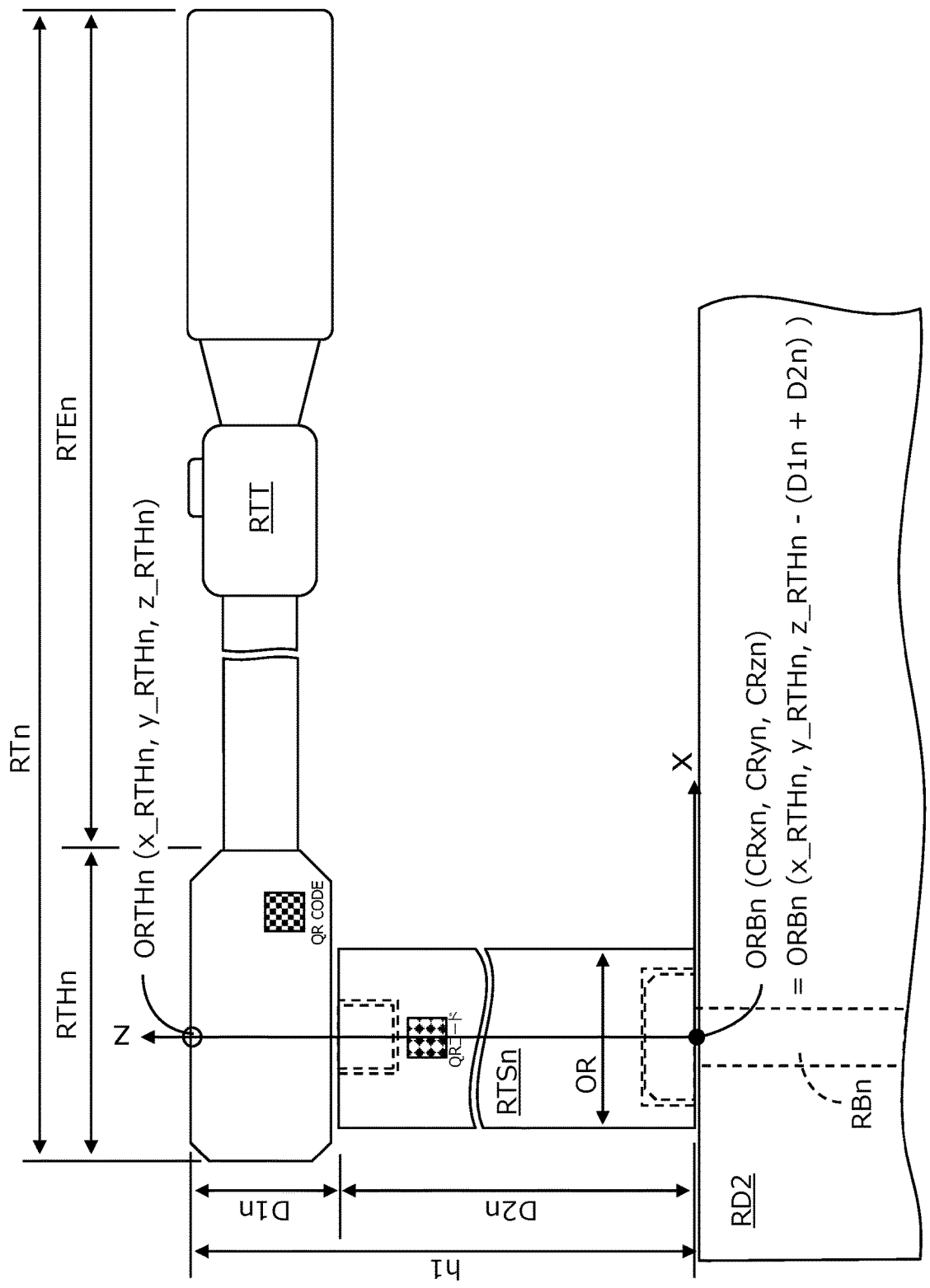
FIG. 5 is a schematic view that illustrates, when fastening a bolt with a tool provided with a socket, a relation between a representative point of the tool and a representative point of the bolt, according to an embodiment of the present invention.

Next, with reference to FIG. 5, description is given regarding, when fastening a bolt with a tool provided with a socket, a relation between a representative point of the tool and a representative point of the bolt, according to an embodiment of the present invention.

FIG. 5 is a schematic view that illustrates, when fastening a bolt with a tool provided with a socket, a relation between a representative point of the tool and a representative point of the bolt. More specifically, FIG. 5 is a schematic view for when work to fasten a bolt RBn, which is for fastening the component RD2 to the base RD1 by a prescribed fastening target torque (Tr_Set) using the tool RTn which is configured from the tool head RTHn and the tool handle section RTEn, has completed.

When the representative position (coordinates) ORBn for the bolt RBn is disposed in an aspect that goes straight in an x-y plane formed by an x axis in the horizontal direction within the paper surface and a y axis in a normal direction for the paper surface, a position (coordinates) ORTHn for the tool head RTHn and the axis for the cylindrical socket RTSn overlap with a z axis (axis in vertical direction within the paper surface).

Letting the thickness (dimension in z direction) of the tool head RTHn be Din and the height dimension following the z axis for the socket RTSn be D2n, a tool dimension h1 (hereinafter, may be simply written as dimension h1) from the representative position (coordinates) ORTHn for the tool head RTHn to the position ORBn of the bolt RBn is the sum of the tool head thickness dimension Din and a socket length dimension D2n.

Note that a marker that is used in image analysis after being captured by the camera 10 is attached to a side surface of the tool head RTHn and a side surface of the socket RTSn, which are illustrated in FIG. 5.

<Description of Situation in which Bolt Fastening Torque Observed by the Tool RTn Arises>

Figure 6:
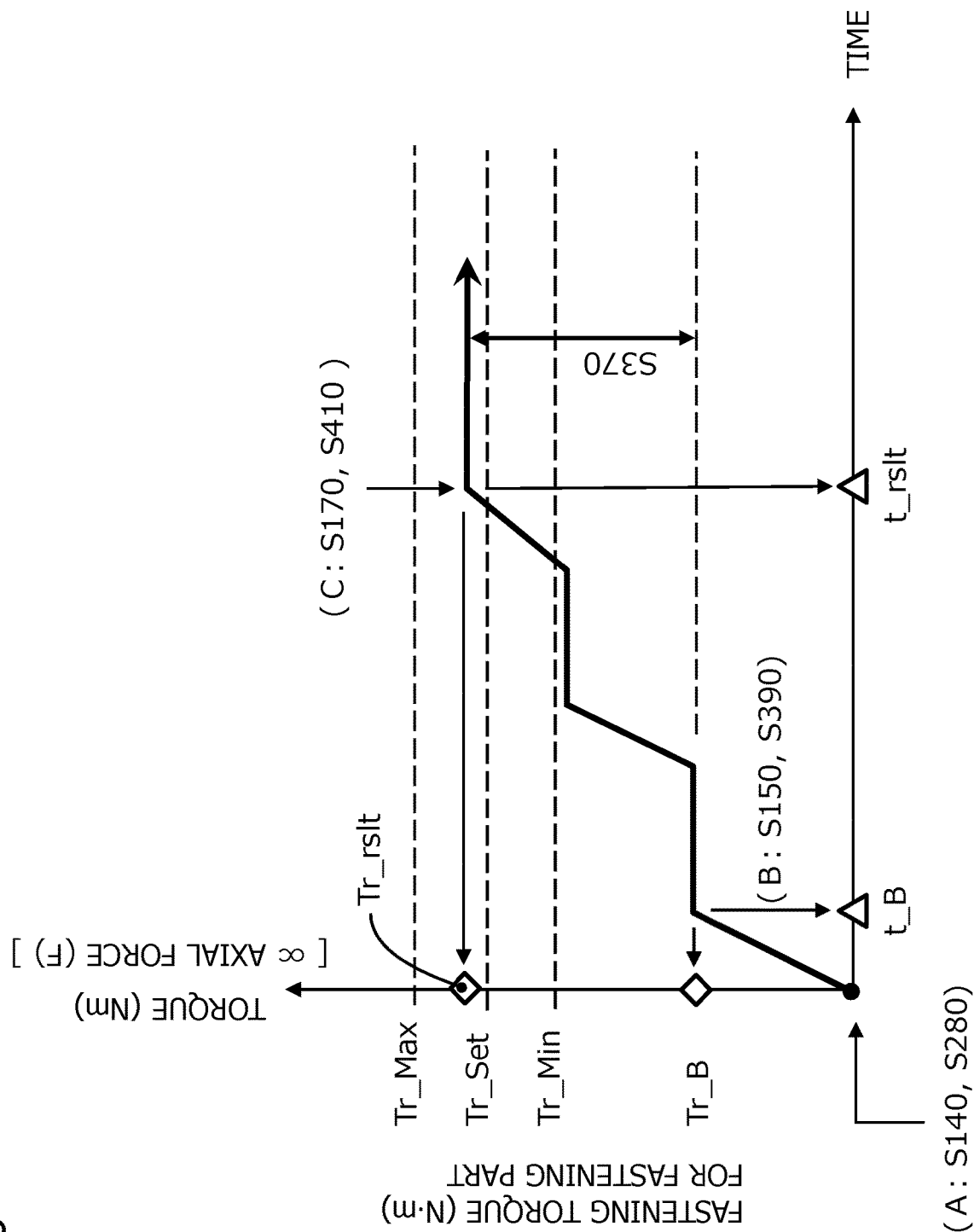
FIG. 6 is a schematic view that illustrates change for fastening torque observed when fastening a bolt with a tool, according to an embodiment of the present invention.
Figure 7:
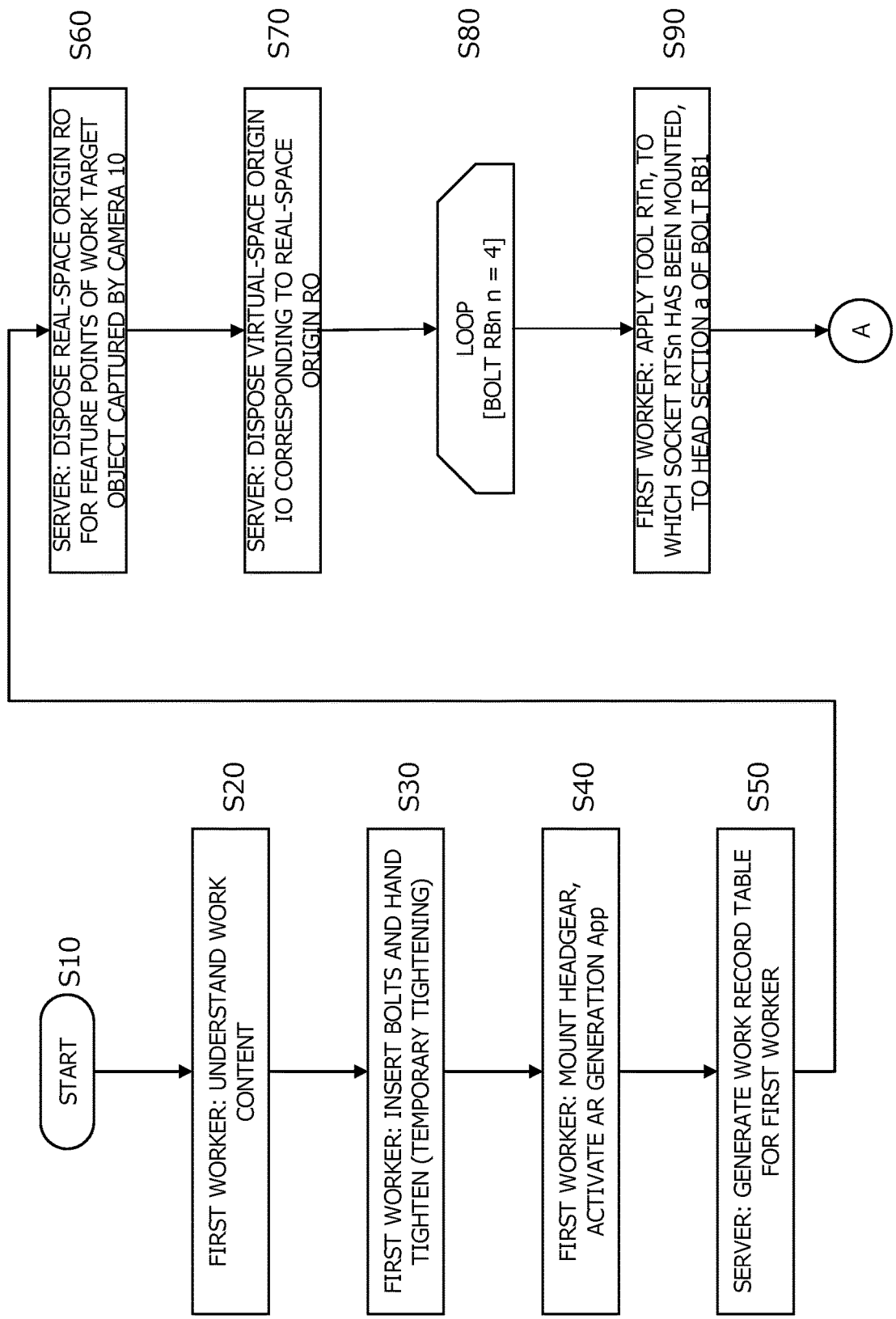
FIG. 7 is a view that illustrates a flow chart (part 1) for describing the mechanical fastening work method using augmented reality according to the present invention, according to an embodiment of the present invention.
Figure 8:
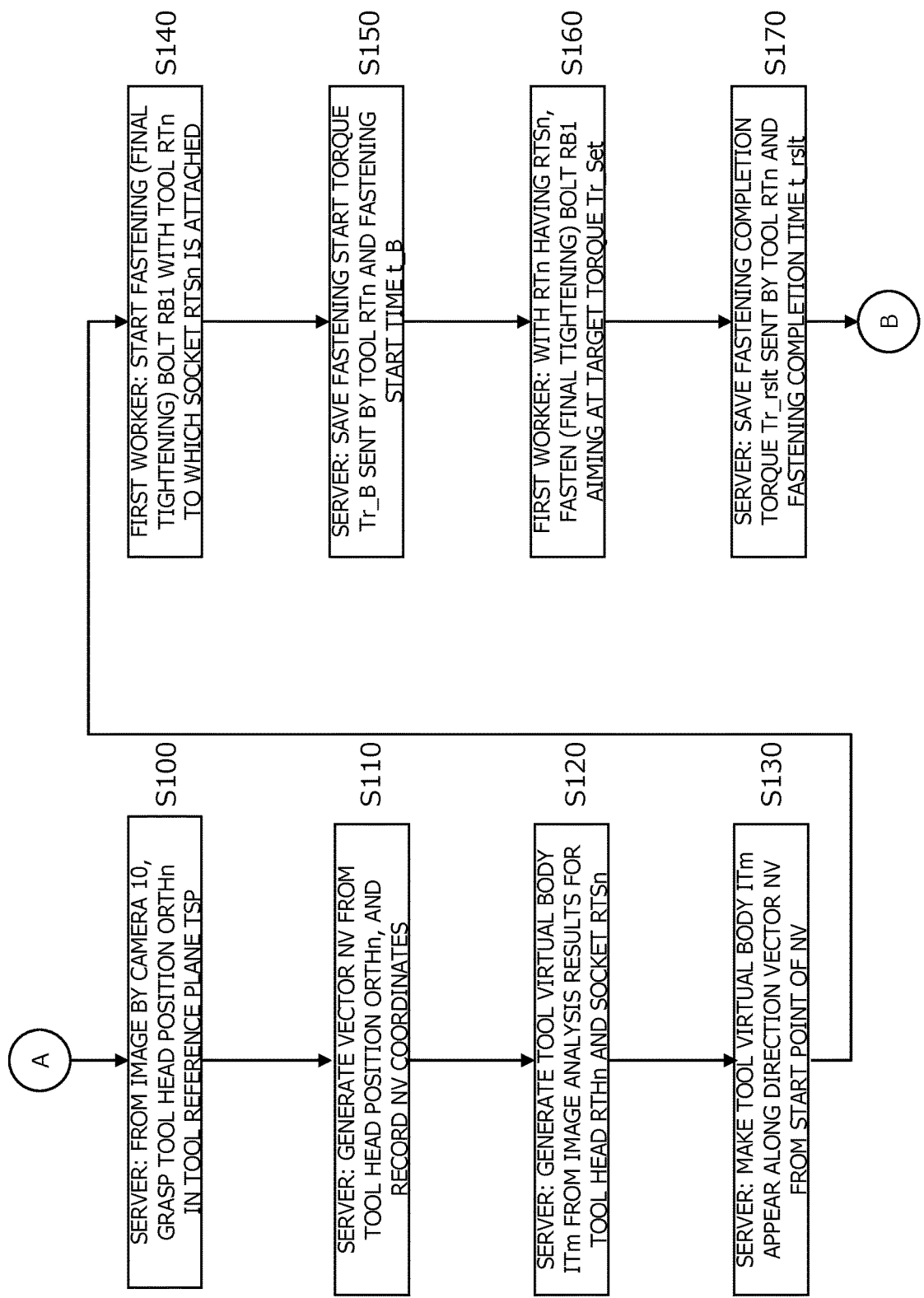
FIG. 8 is a view that illustrates a flow chart (part 2) for describing the mechanical fastening work method using augmented reality according to the present invention, according to an embodiment of the present invention.
Figure 9:
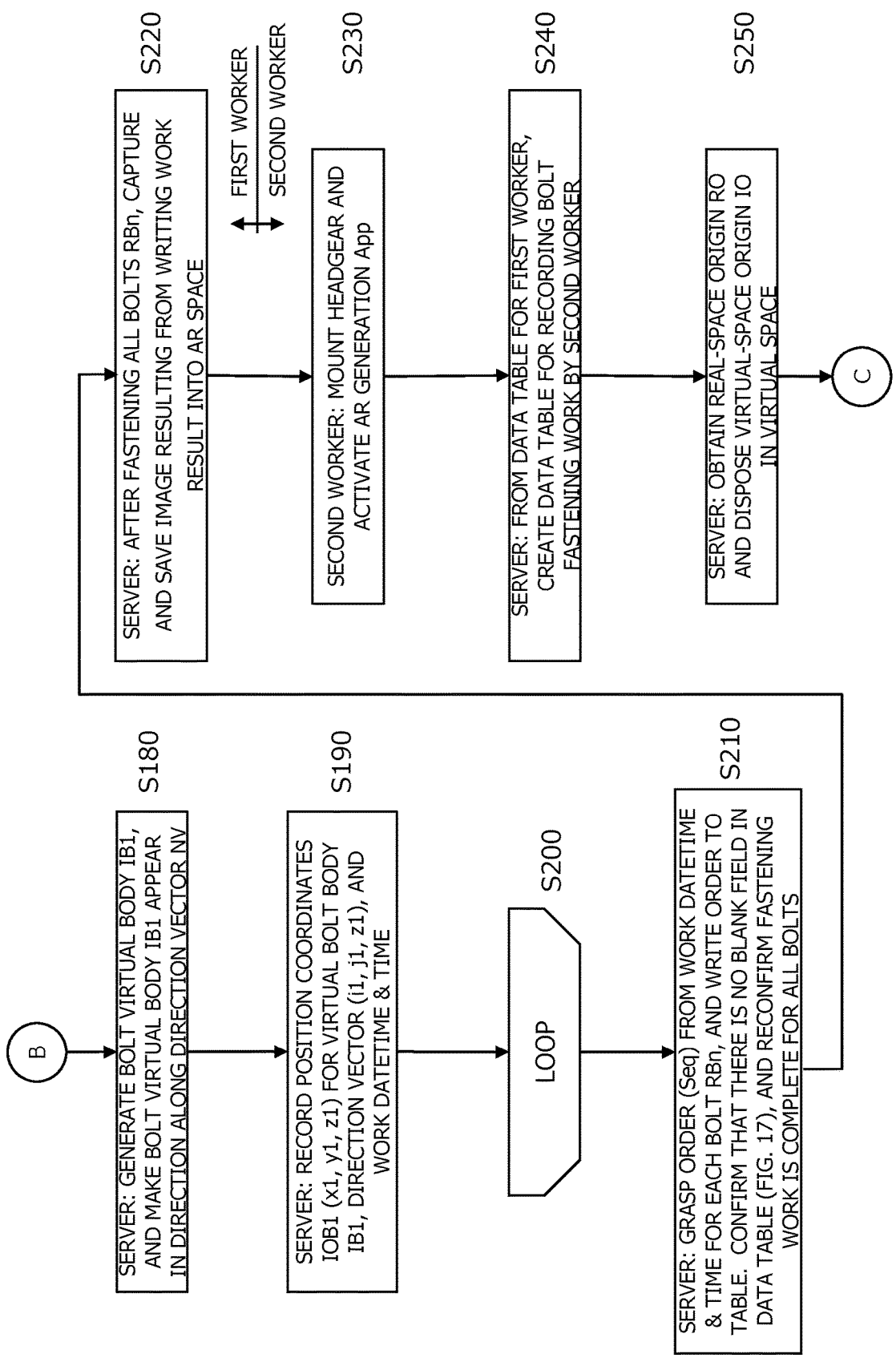
FIG. 9 is a view that illustrates a flow chart (part 3) for describing the mechanical fastening work method using augmented reality according to the present invention, according to an embodiment of the present invention.
Figure 10:
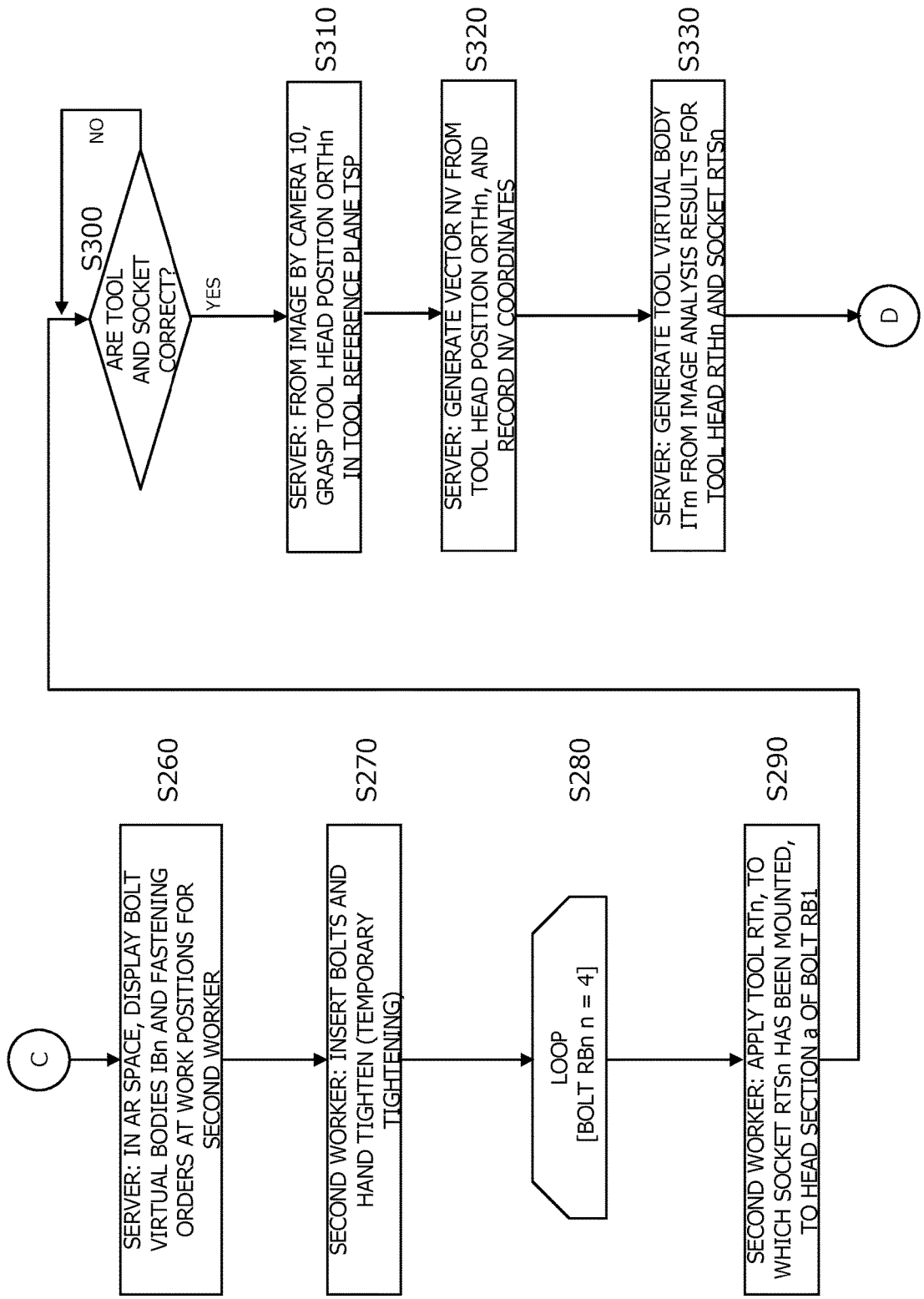
FIG. 10 is a view that illustrates a flow chart (part 4) for describing the mechanical fastening work method using augmented reality according to the present invention, according to an embodiment of the present invention.
Figure 11:
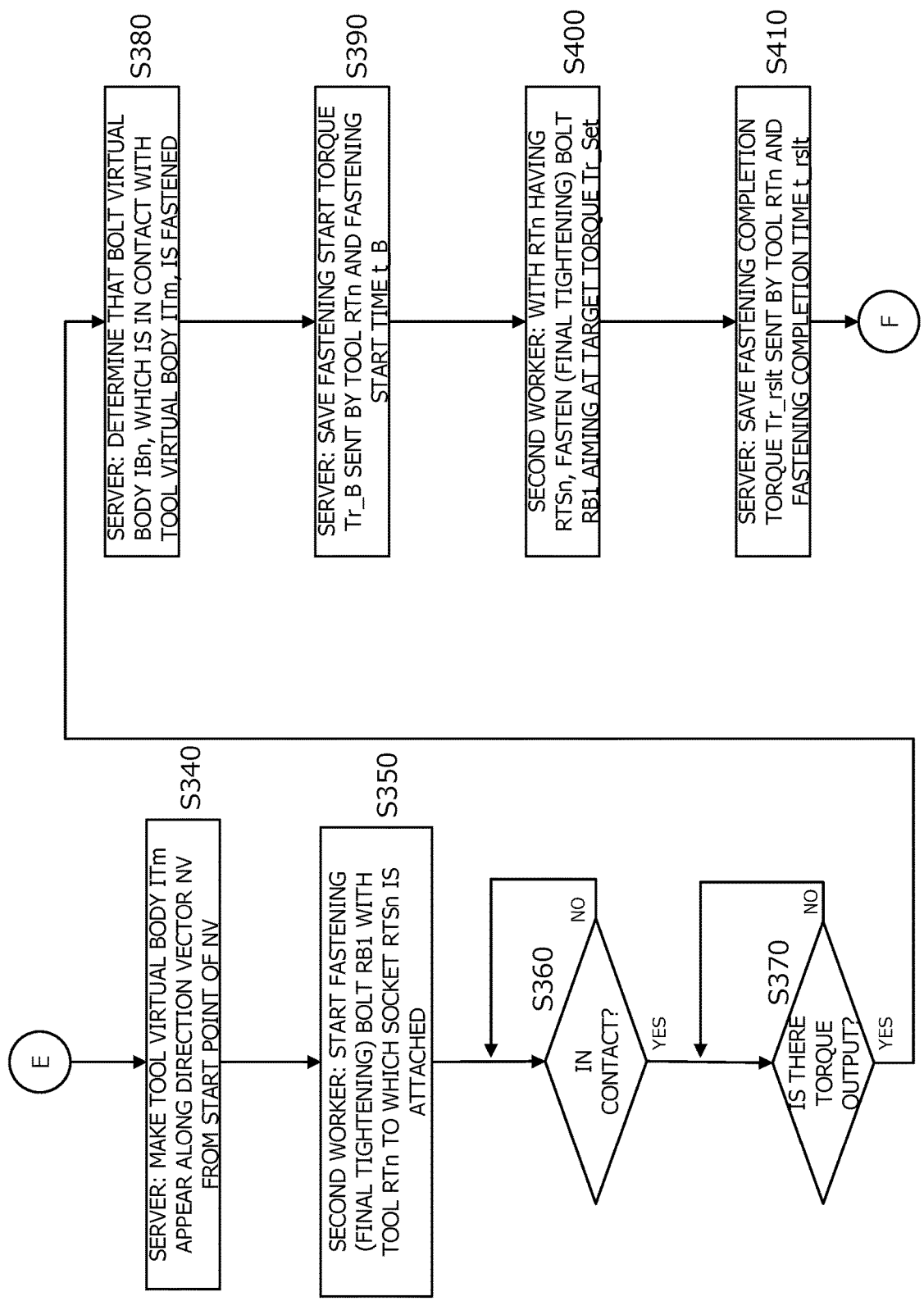
FIG. 11 is a view that illustrates a flow chart (part 5) for describing the mechanical fastening work method using augmented reality according to the present invention, according to an embodiment of the present invention.
Figure 12:
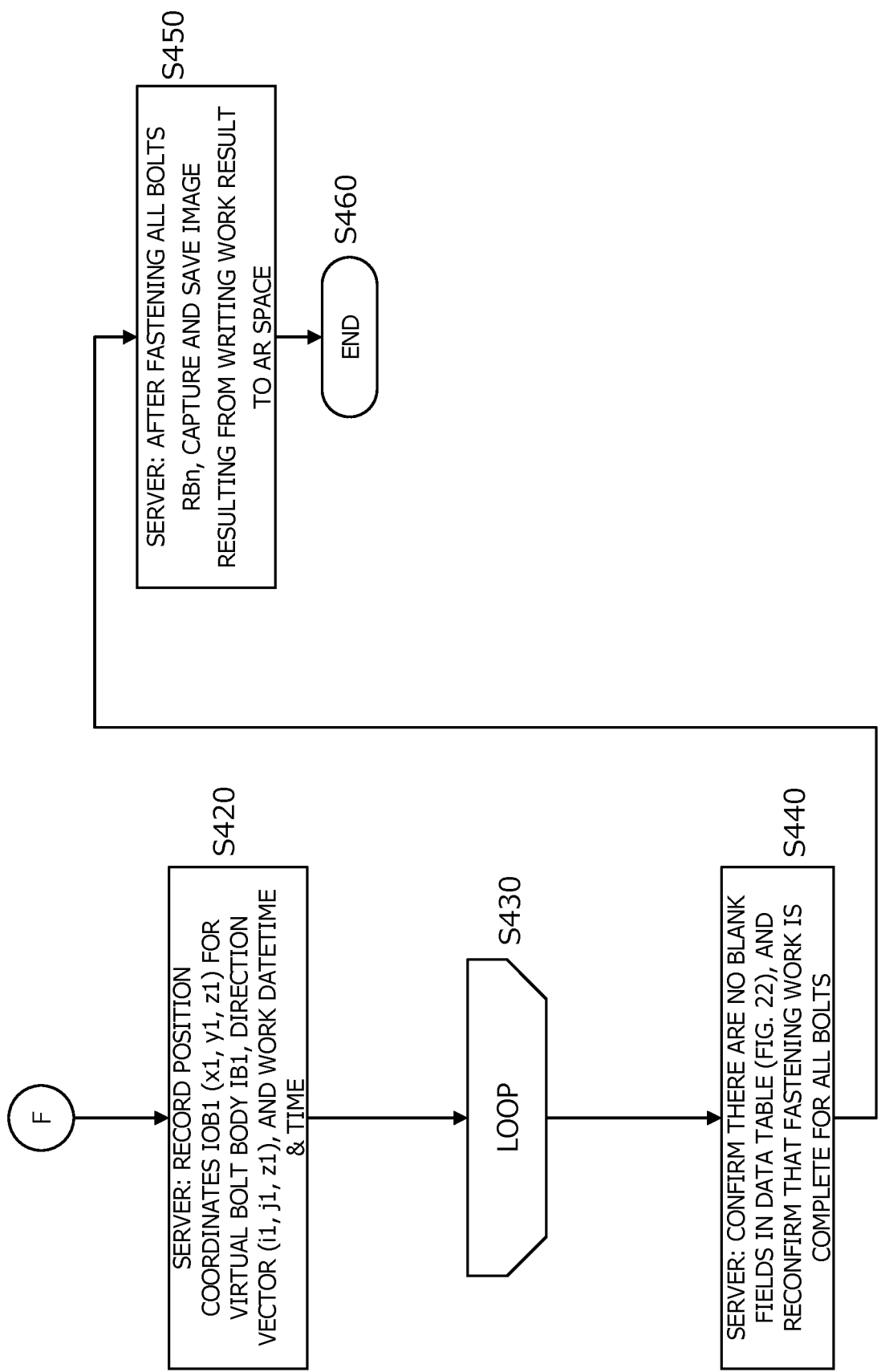
FIG. 12 is a view that illustrates a flow chart (part 6) for describing the mechanical fastening work method using augmented reality according to the present invention, according to an embodiment of the present invention.

Next, with reference to FIG. 6, description is given regarding change in fastening torque observed when fastening a bolt with a tool, according to an embodiment of the present invention.

FIG. 6 is a schematic view that illustrates change in a fastening torque value (hereinafter may be simply written as torque) observed when fastening a bolt with a tool. Typically, it is desirable to manage a fastening state for a bolt by axial force arising in the bolt, such that bolt breakage due to excess fastening or looseness due to insufficient fastening do not arise for the bolt. However, because it is not easy to directly observe axial force for a bolt, in place of bolt axial force, the fastening state for a bolt is managed by fastening torque, which is proportional to the axial force for a bolt.

The horizontal axis in FIG. 6 represents time, and the vertical axis represents fastening torque measured by the tool RTn when fastening a bolt RBn by the tool RTn. The display communication unit RTT that the tool RTn is provided with transmits and receives, to and from a network server (for example, the network server 26 illustrated in FIG. 1) via a network described above (for example, the network 5 illustrated in FIG. 1), fastening torque information (fastening torque time history data, fastening torque, etc.) obtained when fastening the bolt RBn by the tool RTn.

When fastening of the bolt RBn by the tool RTn starts, the tool RTn observes a fastening start torque Tr_B at a fastening start time t_B. Afterwards, because the tool RTn is returned (ratchet returning operation) and the bolt RBn is fastened by the tool RTn again, a sloped section at which the fastening torque is observed and a horizontal section at which fastening torque observed at a time of a returning operation is not observed are alternatingly observed.

In particular, in a case where the slope (for example, a rate of increase in the torque value with respect to an angle swept by the tool handle section RTEn) of the sloped section at a time of observing the fastening start torque Tr_B exceeds a predetermined slope, the network server (for example, the network server 26 or the augmented reality server 12 which are illustrated in FIG. 1) can, via the transmissive screen 14, instruct a worker to, for example, inspect a fastening location upon determining that biting (in other words, due to frictional heat between the screw thread on the bolt RBn and a threaded hole Ron in the base RD1, the surface of the screw thread has melted (welded) and the threaded hole and the bolt RBn has stopped moving), a so-called "seizing" phenomenon, has arisen for the bolt RBn. The above-described biting (seizing) is detected in step 150 and step 390 in a flow chart described by FIG. 7 to FIG. 12. By including these steps, it is possible to detect bolt biting at an early stage, and realize fastening work that provides predetermined quality.

For the bolt RBn, a fastening target torque Tr_Set at which a predetermined axial force is achieved as well as a fastening lower-limit torque Tr_Min for a lower limit that can be tolerated on an insufficient side for fastening torque and a fastening upper-limit torque Tr_Max for an upper limit that can be tolerated on an excess side for fastening torque, which are based on the fastening target torque Tr_Set, are set. Typically, the fastening lower-limit torque Tr_Min and the fastening upper-limit torque Tr_Max may be determined in consideration of a usage environment, etc.

<Method for Recording Work Content by First Worker and Teaching Created Work Procedure (Manual) to Second Worker>

Next, with reference to FIG. 7 to FIG. 12, description is given regarding a mechanical fastening work method using augmented reality, according to the present invention.

FIG. 7 to FIG. 12 are views that illustrate part 1 to part 6 of a flow chart for describing the mechanical fastening work method using augmented reality, according to the present invention. In addition, step 10 (S10) to step 220 (S220) pertain to work by a first worker, and step 230 (S230) to step 460 (S460) pertain to work by a second worker who is taught work content by the first worker.

In a case where there is no information regarding a virtual space such as a 3D-CAD model, the mechanical fastening work method using augmented reality according to an embodiment of the present invention can record (ensure traceability for) work content by the first worker in an augmented reality space, create a work procedure (manual) for the second worker on the basis of a work record for the first worker, and teach the created work procedure to the second worker via the augmented reality space.

Specifically, the mechanical fastening work method using augmented reality according to the present invention is a method in which the augmented reality server 12 (for example, the augmented reality server 12 or the network server 26 which are illustrated in FIG. 1) saves work content by the first worker, subsequently creates a work procedure (manual) using saved information, and teaches the created work procedure to the second worker via the wearable apparatus 7 that the second worker has mounted.

Giving the assembly work illustrated in FIG. 2 as an example, with reference to the flow chart in FIG. 7 to FIG. 12, description is given below for content of each step that makes up the mechanical fastening work method using augmented reality.

<Fastening Work by First Worker>

Step 10 (S10): Start mechanical fastening work (method) using augmented reality.

Step 20 (S20): The first worker understands assembly work content from the assembly drawing (FIG. 2), the work instruction document (FIG. 3), etc.

Figure 13:
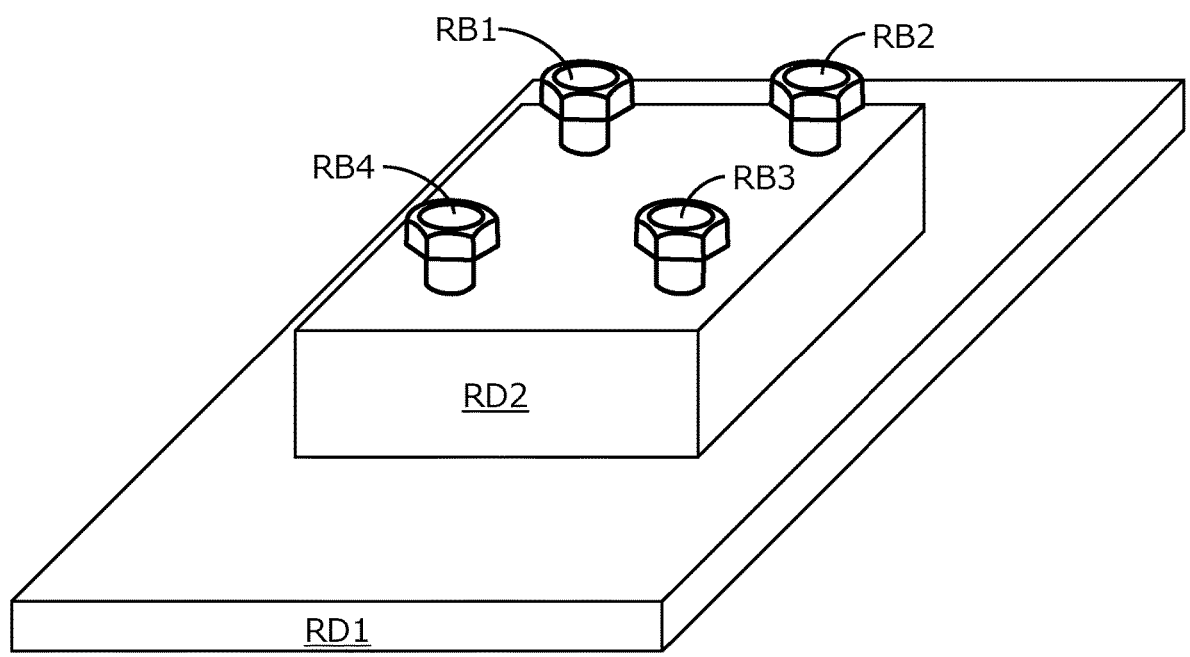
FIG. 13 is a schematic view that illustrates a situation in which a first worker has temporarily tightened bolts inserted into predetermined positions, according to an embodiment of the present invention.

Step 30 (S30): On the basis of the understood work content, the first worker positions the component RD2 on the base RD1, subsequently inserts the bolts RBn (n=1 to 4) into the through holes RPn (n=1 to 4) in the component RD2 as illustrated in FIG. 13, and subsequently hand tightens (temporarily tightens) the bolts RBn into threaded holes RQn (n=1 to 4) in the base RD1.

Note that the bolts RBn (n=1 to 4) are in a temporarily tightened state, and thus the head sections a of the bolts RBn (n=1 to 4) are in a state of floating above the top surface of the component RD2.

Step 40 (S40): The first worker mounts the wearable apparatus 7, turns the power supply on, and activates augmented space generation application software.

Step 50 (S50): A server creates a record table for recording work content by the first worker. This record table is a data table for before work in which the first worker fastens the bolts (refer to FIG. 14).

For the bolts RBn (n=1 to 4) to be subject to fastening work, this data table is provided with fields for the position coordinates (X, Y, Z) of representative points for the bolts (ORBn (n=1 to 4) in FIG. 4); a unit direction vector (in, jn, kn) (n=1 to 4, hereinafter may be simply referred to as a direction vector) that has one point (tool head representative position ORTHn) on the tool RTn as a start point and indicates a direction in which the bolts RBn (n=1 to 4) are present seen from the tool RTn; a fastening torque lower-limit value Tr_Min (Nm), a fastening target torque value Tr_set (Nm), a fastening torque upper-limit value Tr_Max (Nm), and a torque value (Tr_rslt) at which fastening has been actually performed for the bolts RBn (n=1 to 4); an order (Seq) in which the bolts RBn (n=1 to 4) are to be fastened; a work date; and a work time.

Note that, at the time of S50, only the fastening torque lower-limit value Tr_Min (Nm), fastening target torque value Tr_Set (Nm), and the fastening torque upper-limit value Tr_Max (Nm), which are for the bolts RBn (n=1 to 4) and are obtained from the work instruction document (FIG. 3), for example, are written to this data table (FIG. 14).

Step 60 (S60): The server performs image processing on a work target object (the base RD1 and the component RD2 temporarily tightened by the bolts RBn (n=1 to 4) illustrated in FIG. 13) that has been captured by the camera 10, finds feature points for the work target object, and disposes a real-space origin RO for these feature points.

Step 70 (S70): The server disposes, in the virtual space, the virtual-space origin IO which corresponds one-to-one to the real-space origin RO.

From step 80 (S80) to step 200 (S200) is loop work in which the first worker fastens the four bolts RBn (n=1 to 4). The first worker may determine the order in which to fasten the bolts RBn (n=1 to 4) on the basis of their own experience based on the size or features of the component RD2, or may make a determination with reference to, for example, a work instruction manual (not illustrated) in an order of fastening bolts is written.

Step 90 (S90): The first worker applies the tool RTn, to which the socket RTSn has been mounted, to the head section a of the bolt RB1 which has been temporarily tightened.

In a case where the correspondence between the bolt RBn and the socket RTSn can be understood in advance and this correspondence information is set forth in the work instruction document illustrated in FIG. 3, a flow item for determining whether or not the first worker has selected the correct socket RTSn for the bolt RBn to be fastened may be added after S90.

Step 100 (S100): The server grasps a tool head position ORTHn within a tool reference plane TSP, from the image obtained by the camera 10.

Step 110 (S10): With the tool head position ORTHn included in the tool reference plane TSP as a start point, the server generates a unit normal vector NV for the tool reference plane TSP going toward a space on a side of the tool reference plane TSP that is not visually recognized by the camera 10, and records coordinates (in, jn, kn) (n=1 to 4) for the unit normal vector NV.

The unit normal vector NV indicates a direction in which is positioned the bolts RBn (n=1 to 4), which are present on the side of a surface from among one surface and the other surface of the tool reference plane TSP. Accordingly, the unit normal vector NV is simply written as a direction vector NV below.

Step 120 (S120): The server performs image analysis on the tool head RTHn and the socket RTSn to thereby generate a tool virtual body ITm in virtual space.

Step 130 (S130): The server causes the tool virtual body ITm to appear along a direction vector NV from the tool head position ORTHn for the start point of the direction vector NV.

Figure 15:
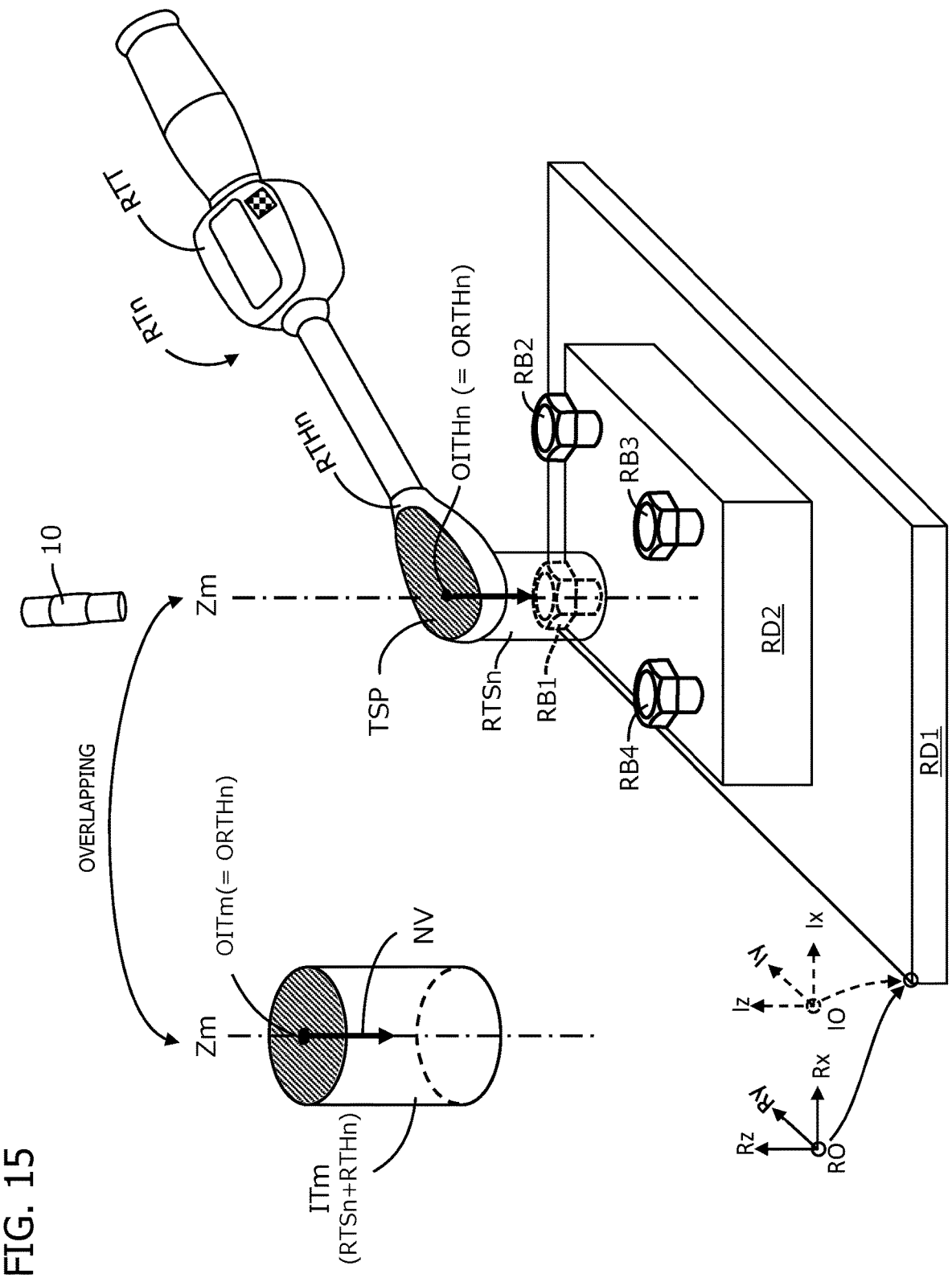
FIG. 15 is a schematic view that illustrates a situation in which a tool virtual body for simulating a tool appears in a virtual space, according to an embodiment of the present invention.

Next, with reference to FIG. 15, operations for the server which are described in step 90 to step 120 (a procedure for causing a tool virtual body ITm which simulates the tool RTn to appear in virtual space) are described in detail. FIG. 15 is a schematic view that illustrates a situation in which a tool virtual body for simulating a tool appears in a virtual space, according to an embodiment of the present invention.

Note that, actually ITm, which is present on a Zm axis, overlaps with the tool head RTHn and the socket RTSN, but in order to make the description easier to understand, ITm is described separately from the tool head RTHn and the socket RTSn in FIG. 15 as well as FIG. 16 and FIG. 17 which are described below.

Firstly, through the transmissive screen 14, the first worker visually recognizes the tool RTn having the socket RTSn applied to the bolt RB1. At this time, the camera 10 also captures an image that the first worker visually recognized.

Note that, in order to make it easier for the camera 10 to grasp features of the tool head RTHn, a cap, etc. having a feature that is easy for the camera 10 to capture may be put on the tool head RTHn.

The server performs image processing on the tool head RTHn of the tool RTn which has been captured by the camera 10, and generates the tool reference plane TSP in the virtual space. In addition, in alignment with this, the server transcribes the tool head position coordinates ORTHn included in the tool reference plane TSP to the virtual space, and generates a tool head position OITHn in the virtual space.

With the virtual-space tool head position OITHn as a start point, the server generates a unit normal vector (direction vector) NV in the normal direction toward a space on the side of the tool reference plane TSP that is not visually recognized by the camera 10, and records coordinates (in, jn, kn) (n=1 to 4) for the direction vector NV.

In addition, from an outer diameter OR of the cylindrical socket RTSn obtained through image processing and the dimension h1 which is the sum of the tool head thickness dimension Din and the socket length dimension D2n obtained in image processing, the server generates a cylindrical tool virtual body ITm having the outer diameter OR and the length h1 in the axial direction in virtual space.

Note that, in a case where it is difficult to acquire the tool head thickness dimension Din, the socket length dimension D2n, and the outer diameter OR of the socket RTSn using image analysis by the server, image analysis may be used to identify the types of the tool head RTHn and the socket RTSn. It may be that the server subsequently obtains the tool head thickness dimension Din, the socket length dimension D2n, and the outer diameter OR of the socket RTSn, which are recorded in the server in advance and associated with the types identified by image analysis, and thereby calculate the dimension h1 and generate the tool virtual body ITm. In addition, it is similar in step 340 described below.

Next, the server overlaps a tool virtual body representative point OITm on the virtual-space tool head position OITHn (=tool head position ORTHn in real space), and causes the tool virtual body OITm to appear in the direction in which the direction vector NV faces.

Step 140 (S140): Aiming for the fastening target torque Tr_Set, the first worker starts fastening (final tightening) the bolt RB1 with the tool RTn to which the socket RTSn is attached.

Step 150 (S150): The server receives the fastening start torque Tr_B measured by the tool RTn, and records the time at which the fastening start torque Tr_B has been received as a fastening start time t_B.

Step 160 (S160): The first worker confirms that a fastening complete torque Tr_rslt observed by the tool RTn is close to the target torque Tr_Set (for example, within a predetermined range that has been set in advance) and is between the fastening lower-limit torque Tr_Min and the fastening upper-limit torque Tr_Max, and then completes fastening for the bolt BR1.

Step 170 (S170): The server records the fastening complete torque Tr_rslt sent by the tool RTn and records the time at which the fastening complete torque Tr_rslt has been observed, as a fastening completion time t_E.

Step 180 (S180), the server defines a cylindrical bolt virtual body IB1 corresponding one-to-one to the bolt RBn which has been tightened or loosened by the tool RTn, and makes the bolt virtual body IB1 appear by generating the bolt virtual body IB1 in the virtual space in a direction along the direction vector NV.

Step 190 (S190): The server records, in a first work table (data table illustrated in FIG. 14), coordinates (x1, y1, z1) for a representative position IOB1 for a virtual bolt body IB1 corresponding to the bolt RB1 in real space, coordinates (i1, j1, z1) for the direction vector NV, the work datetime, and the fastening completion time (a time at which the fastening complete torque Tr_rslt has been observed) for the bolt RB1.

Here, the coordinates (x1, y1, z1) for the bolt virtual body IB1 and the direction vector (i1, j1, z1), which indicates the direction in which the bolt virtual body IB1 is positioned with the tool head position ORTHn included in the tool reference plane TSP as a start point, are position information for the mechanical fastening part.

At this point, information regarding the socket RTSn used when fastening the bolt RBn may also be recorded in the first work table. Typically, the socket RTSn, which is selected when fastening a bolt RBn, is selected due to the position of the bolt RBn, that there is sufficient space in front of the bolt RBn, whether or not there is an obstacle, etc.

Accordingly, in a case where the first worker initially performs work, it may be difficult to organize information pertaining to the socket RTSn and write this information in advance in the first work table (FIG. 14) or a work specification document (FIG. 3). Accordingly, it may be that socket information pertaining to the socket RTSn selected by the first worker is recorded in the first work table, the work content is communicated to the second worker, and whether the second worker has selected the appropriate socket RTSn during work is, for example, confirmed in later-described step 300, etc. using, for example, an image captured by the camera 10.

Step 200 (S200): Repeat each step from $80 to S200 for only the number of loops (4 times) for the number of bolts RBn.

Figure 16:
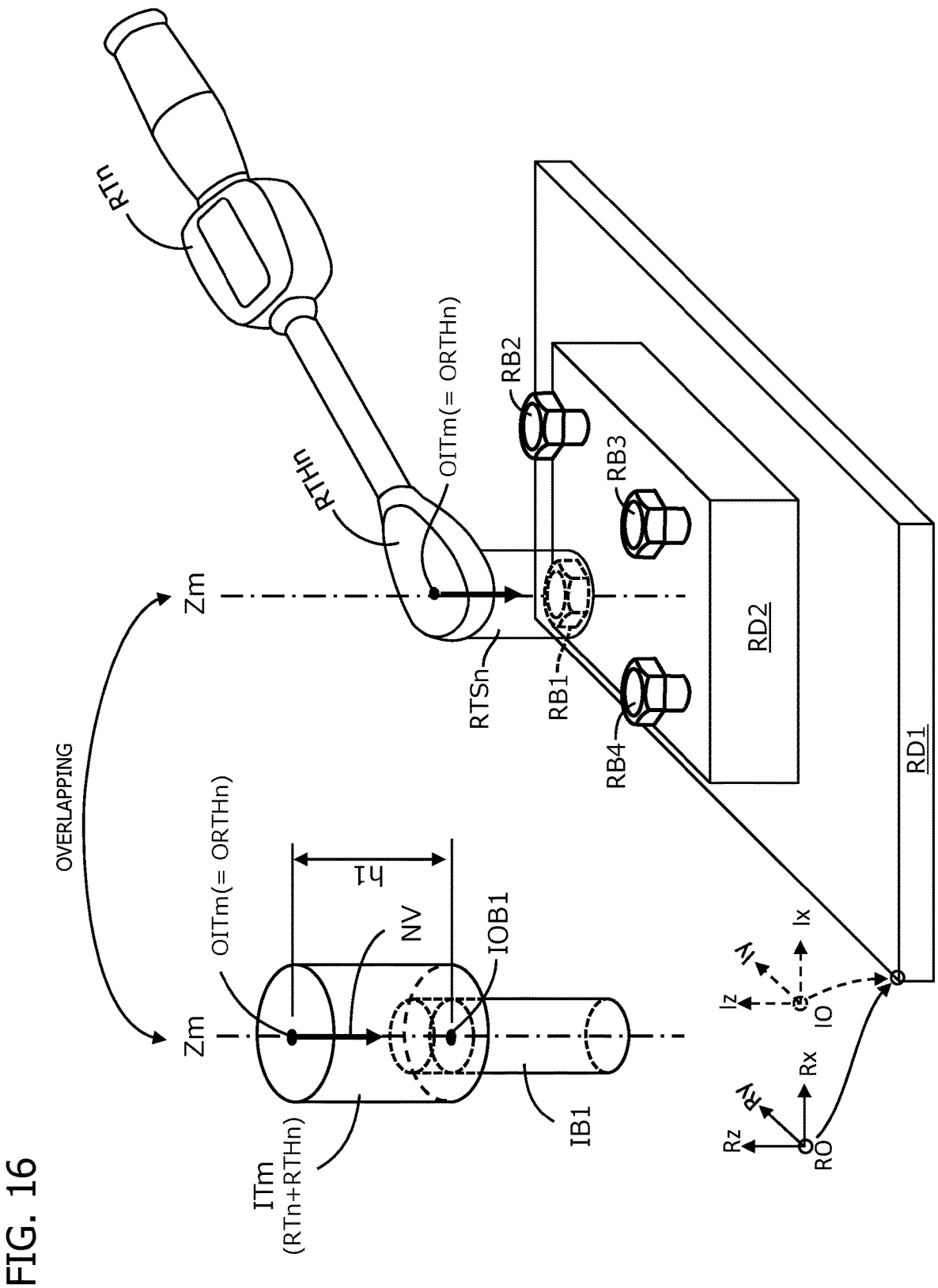
FIG. 16 is a schematic view that illustrates a situation in which a bolt virtual body for simulating a bolt appears in a virtual space, according to an embodiment of the present invention.

Next, with reference to FIG. 16, operations for the server which are described in $180 and $190 (a procedure for the generation and appearance of the bolt virtual body IBn, and recording work by the first worker in the data table) are described in detail. FIG. 16 is a schematic view that illustrates a situation in which a bolt virtual body for simulating a bolt appears in a virtual space, according to an embodiment of the present invention.

Firstly, the server grasps the bolt size and bolt underhead length for the bolt RBn which have been obtained from the assembly drawing in FIG. 2, the work instruction document in FIG. 3, or by image analysis, and forms the cylindrical bolt virtual body IBn having a size which corresponds thereto.

Note that, in a case where it is difficult to grasp the bolt size, bolt underhead length, etc. by image analysis, the server may form the bolt virtual body IBn after grasping the bolt size and the bolt underhead length from the work instruction document (FIG. 3) which is stored in the server.

The entire length of the bolt virtual body IBn is the sum of the dimensions along the z axis for the head section a, the cylindrical section b, and the threaded section c of the bolts RBn (n=1 to 4), and the outer diameter of the bolt virtual body IBn is the outer diameter of the head section a of the bolt RBn when the head section a is seen from the z axis direction.

After obtaining the dimension in the z axis direction for the bolt virtual body IBn, the server disposes the bolt virtual body representative point OIBn at a position lowered from the upper end section of the bolt virtual body IBn by the dimension along the z axis for the head section a.

In addition, when the fastening complete torque Tr_rslt is observed, the server causes the cylindrical bolt virtual body IBn to appear such that the bolt virtual body representative point OIBn is positioned at a point for the dimension h1, which is the sum of the tool head thickness dimension Din and the socket length dimension D2n, along the direction for the direction vector NV from the tool virtual body representative point (ITm).

At this time, the cylindrical tool virtual body ITm and the cylindrical bolt virtual body IBn appear in virtual space in an aspect where the respective axes for the tool virtual body ITm and the bolt virtual body IBn are disposed on a common axis Zm that includes the direction vector NV, and a lower end section of the tool virtual body ITm overlaps with an upper end section of the bolt virtual body IBn.

Because the bolt virtual body representative point OIBn is disposed when the fastening complete torque Tr_rslt is observed, it is possible to dispose the bolt virtual body representative point OIBn on the top surface of the component RD2 (the surface that comes into contact with the bottom surface of the head section a of the bolt) at a position that reflects a sunk dimension due to the bolt RBn which has been temporarily tightened by hand tightening being finally tightened by the tool RTn.

When indicating to the second worker a bolt position in the augmented reality space using the bolt virtual body representative point OIBn by using a method provided with the features described above, the position of the bolt RBn is positioned on the top surface of the component RD2, and thus an effect is achieved in that it is easier for the second worker to sensorially understand the state for a time of bolt fastening and the second worker can easily understand the work content.

Next, with reference to FIG. 17, description is given regarding a data table for recording bolt fastening work by the first worker, according to an embodiment of the present invention.

FIG. 17 is a data table that includes data resulting from recording various items of data pertaining to work by the first worker when the first worker completes fastening all of the bolts RBn (n=1 to 4) (when the loop of S80 to S200 is taken four times).

Note that the data table in FIG. 17 for after the work is complete is a result of adding various items of data, which have been recorded due to the first worker fastening the bolts RBn (n=1 to 4), to the empty fields in the data table in FIG. 14 for before the work.

More specifically, FIG. 17 is a result of adding, to the data table illustrated in FIG. 14, the coordinates (Xn, Yn, Zn) (n=1 to 4) for the bolt virtual body representative point OIBn which are position coordinates in virtual space that correspond to the position coordinates for the bolts RBn (n=1 to 4) in real space, coordinates (in, jn, kn) (n=1 to 4) for the direction vector NV having as a start point the representative point OITm for the tool virtual body ITm in virtual space, the fastening complete torque (Tr_rslt), the order (Seq) in which fastening has been performed, the work date, and the work time.

Note that, in the data table illustrated in FIG. 17, the order (Seq) in which fastening has been performed, the work date, and the work time may be combined and written as "time information." In addition, the work time is set as the time t_E at which the server has received the fastening complete torque Tr_rslt when the bolts RBn (n=1 to 4) have been fastened, but may be set to the bolt fastening start time t_B.

Step 210 (S210): The server grasps the order (Seq) in which the bolts RBn (n=1 to 4) have been fastened from the work times for the bolts RBn (n=1 to 4), and records the order in the data table described above. In addition, together with this, the server reconfirms that there is no omission for fastening work and that the fastening work is complete for all of the bolts RBn (n=1 to 4) to be fastened, by data having been written to all of the empty fields in the data table illustrated in FIG. 14.

Furthermore, the server can easily calculate person-hours for the first worker from the amount of time required from the start of fastening for the bolt RB1 to the completion of fastening for the bolt RB4.

For the order (Seq), an order may be recorded for each of respective bolt fastening completion time t_E at which fastening of the bolts RBn (n=1 to 4) completed, or the order (Seq) may be an order resulting from extracting and lining up in an order from oldest time to newest time the bolt fastening start time t_B or the bolt fastening completion time t_E, when fastening for all bolts has completed.

Figure 18:
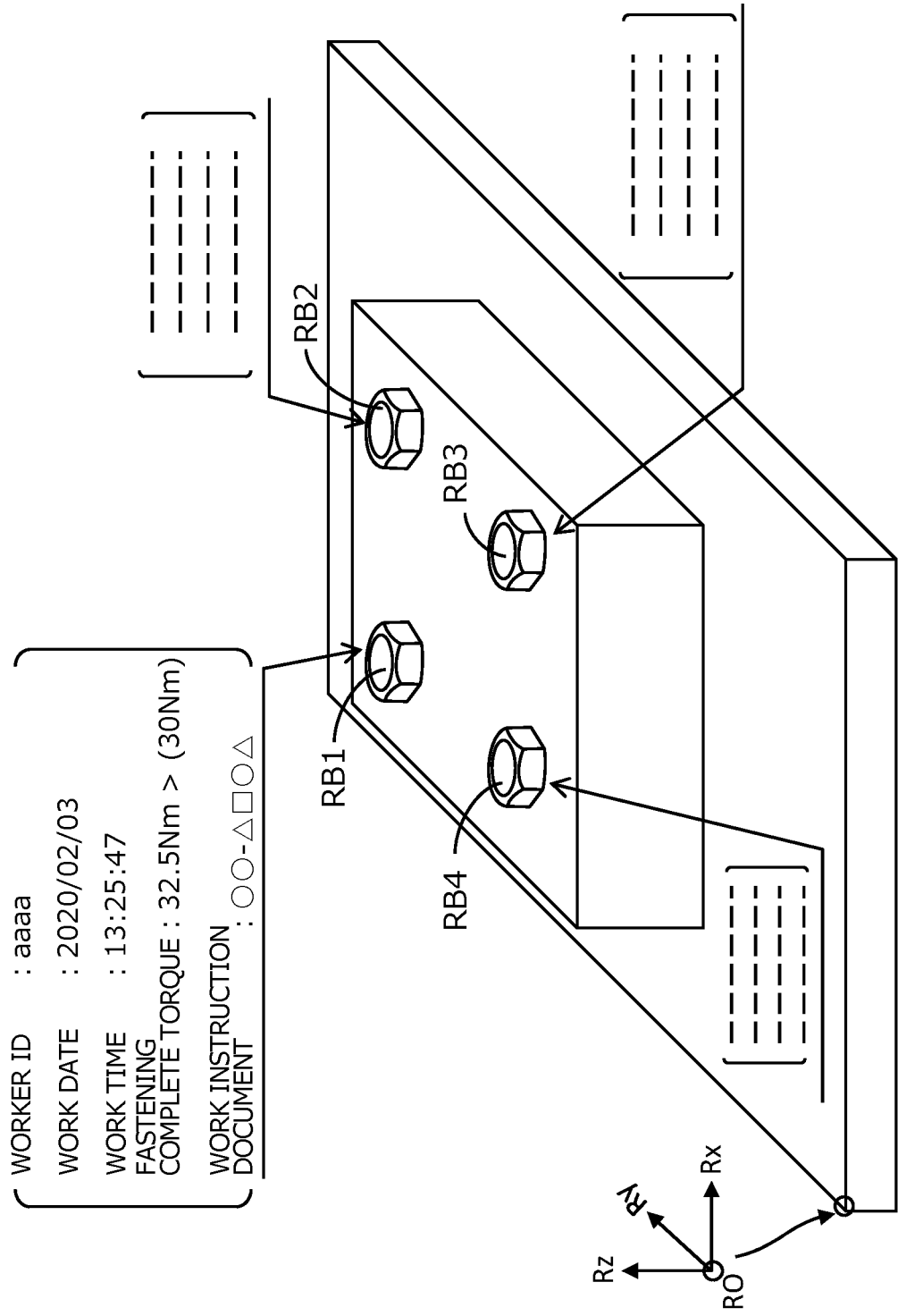
FIG. 18 is a schematic view resulting from capturing an image which is displayed in an augmented reality space after the first worker has fastened all bolts, the image including the fastened bolts and fastening work completion information displayed near these fastened bolts, according to an embodiment of the present invention.

Step 220 (S220): As illustrated in FIG. 18, after all of the bolts RBn (n=1 to 4) are fastened, the server captures and saves an image resulting from writing a work result (worker ID, work date, work time, fastening complete torque value Tr_rslt, work instruction document, etc.) near the bolts RBn (n=1 to 4) in the augmented reality space which includes fastening work target objects. By saving this captured image, even in a case where some data in the data table illustrated in FIG. 17 in which the bolt fastening work by the first worker has been recorded is damaged or lost, it is possible to secure evidence (traceability) pertaining to bolt fastening work.

In accordance with the mechanical fastening work method provided with each of the steps described above, it is possible to provide a high-quality mechanical fastening work method having lower operating costs with which it is possible to confirm that bolt fastening work to be performed by a worker has been reliably performed without a work omission, and it is possible to ensure traceability by recording a result of work performed.

<Fastening Work by Second Worker>

Steps being the subsequent step 230 and thereafter pertain to bolt fastening work by the second worker who is taught work content using work instructions (a manual) generated on the basis of the work content by the first worker.

Step 230 (S230): The second worker mounts the wearable apparatus 7, turns the power supply on, and activates augmented space generation application software.

Step 240 (S240): The server creates a second work table (data table illustrated in FIG. 19) that is for recording bolt fastening work by the second worker and results from removing data for the fastening complete torque Tr_rslt, the work date, and the work time from the first work table (FIG. 17) for the time at which the fastening work by the first worker completed. At this time, the second work table has position information for each bolt RBn fastened by the first worker.

Step 250 (S250): The server performs image processing on a work target object (the base RD1 and the component RD2 temporarily tightened by the bolts RBn (n=1 to 4) illustrated in FIG. 13) that has been captured by the camera 10, finds feature points for the work target object, and disposes a real-space origin RO. Afterwards, the server disposes in the virtual space a virtual-space origin IO, which is in one-to-one correspondence with this real-space origin RO.

Step 260 (S260): The server reads the second work table created in S210 into the augmented reality space that includes the work target object for the second worker, and, based on the virtual-space origin IO disposed in S250, makes the bolt virtual bodies IBn (n=1 to 4) appear in the augmented reality space on the transmissive screen 14 for the second worker, on the basis of the coordinates (Xn, Yn, Zn) (n=1 to 4) for the bolt virtual body representative point OIBn and the coordinates (in, jn, kn) (n=1 to 4) for a direction vector NV having the representative point OITm for the tool virtual body ITm as a start point.

Next, with reference to FIG. 20, description is given regarding bolt fastening work by the second worker, according to an embodiment of the present invention.

FIG. 20 is a schematic view that illustrates positions for bolts to be fastened by the second worker, and is an image of an augmented reality space displayed by a transmissive screen for the second worker.

The server creates a data table (the second work table illustrated in FIG. 19) resulting from deleting only the fastening complete torque Tr_rslt, the work date, and the work time for work performed by the first worker from the data table (the first work table illustrated in FIG. 17) that recorded work history for the first worker who has completed their work, while keeping the bolt positions (Xn, Yn, Zn), the direction vector NV (in, jn, kn) indicating the direction in which the bolt RBn is positioned from the tool RTn, and the fastening order. Afterwards, on the basis of this second work table, the server can display, on the transmissive screen 14 for the second worker, the bolt positions, the number of bolts, and the order for fastening the bolts, for which fastening is to be performed by the second worker.

As a result, the second worker can accurately and in a short amount of time understand the bolt positions, the number of bolts, and the order for fastening the bolts, for which fastening is to be performed, without perusing the assembly drawing (FIG. 2) or the work instruction document (FIG. 3).

At this time, because the bolt representative position ORBn illustrated in FIG. 4 defines the representative position OIBn for each bolt virtual body IBn, each bolt virtual body IBn is displayed on the transmissive screen 14 for the second worker in an aspect where the representative positions OIBn for the bolt virtual bodies IBn (n=1 to 4) are positioned on the surface of the component RD2, and thus the second worker can easily understand a state for after the completion of bolt fastening work.

By projecting information in the second work table, which has been created using the first work table (FIG. 17) that records work history for the first worker, into an augmented reality space (for example, the transmissive screen 14 illustrated in FIG. 1), it is possible to instruct the second worker on a fastening order for the bolts RBn. In accordance with this instruction, for the second worker, it is possible for the second worker to complete fastening work in a state where parallelism for the component RD2 with respect to the base RD1 is maintained, and the second worker can easily fix the component RD2 to the component RD1 in a case where positioning is difficult due to, for example, the shape of the component RD2 or an attachment orientation for the component RD2.

As described above, for the fastening order (Seq) for the bolts RBn (n=1 to 4), an order may be recorded for each respective bolt fastening at which fastening completed, or the fastening order (Seq) may be a bolt fastening order resulting from extracting and lining up in an order from oldest time to newest time the bolt fastening start time t_B or the bolt fastening completion time t_E, when fastening for all bolts has completed.

Note that, means for teaching work content (position of bolts to be fastened, order for fastening bolts, etc.) by the first worker to the second worker is not limited to the transmissive screen 14 provided in the wearable apparatus 7 mounted by the second worker, and, for example, a work procedure (manual) created on the basis of operations by the first worker may be projected onto a large screen, etc. placed at the work site to thereby teach the work procedure to the second worker.

Next, returning to FIG. 10, description is given regarding step 270 and subsequent steps.

Step 270 (S270): On the basis of the work content instructed via the transmissive screen 14, the second worker positions the component RD2 on the base RD1, subsequently inserts the bolts RBn (n=1 to 4) into the through holes RPn (n=1 to 4) in the component RD2 in an aspect overlapping with the bolt virtual bodies IBn (n=1 to 4) illustrated in FIG. 20, and subsequently hand tightens (temporarily tightens) the bolts RBn into threaded holes Ron (n=1 to 4) in the base RD1.

Figure 21:
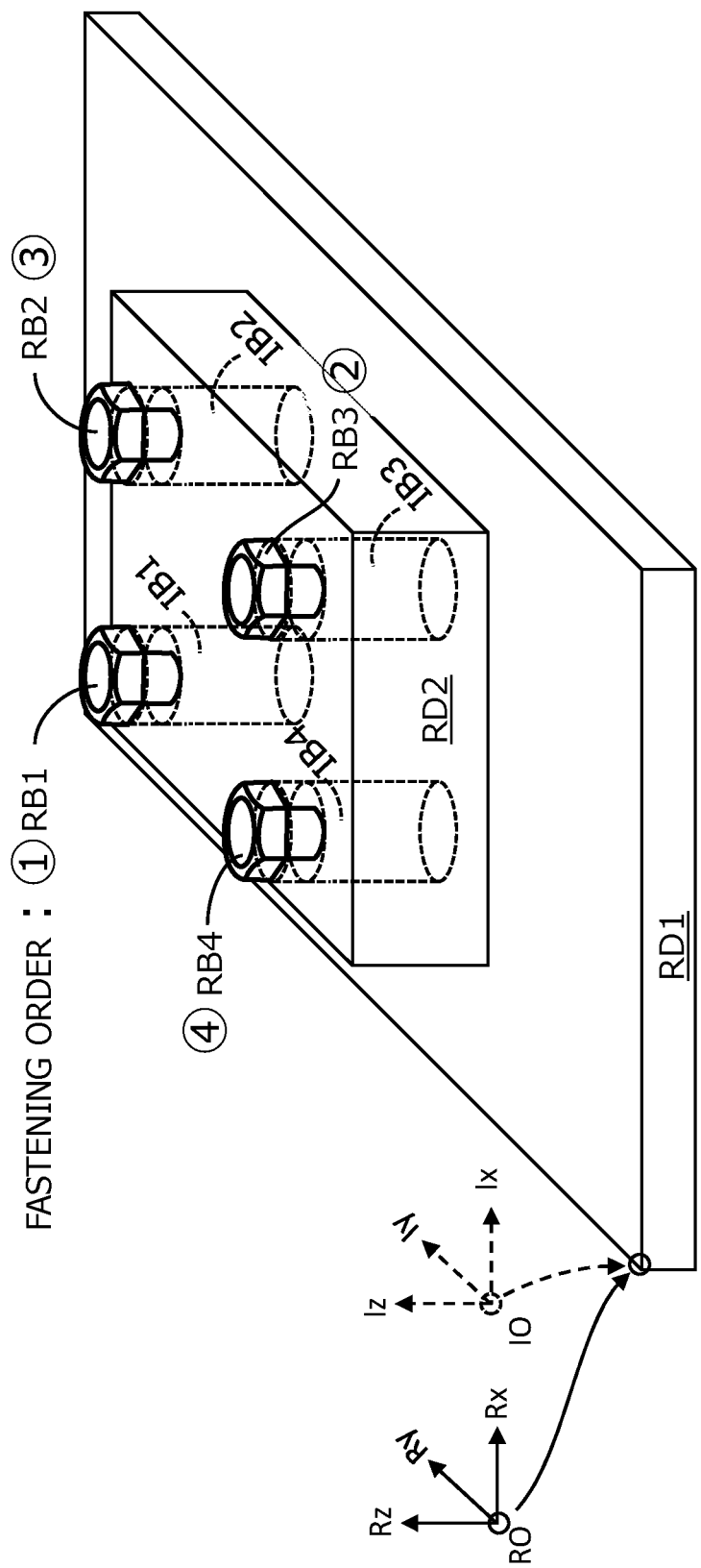
FIG. 21 is a schematic view that illustrates a situation in which the second worker has temporarily tightened bolts inserted into predetermined positions, on the basis of an image (FIG. 5) of an augmented reality space displayed on the transmissive screen for the second worker, according to an embodiment of the present invention.

Note that, as illustrated in FIG. 21, the bolts RBn (n=1 to 4) are in a temporarily tightened state, and thus the head sections a of the bolts RBn (n=1 to 4) are in a state of floating above the top surface of the component RD2.

Steps from step 280 (S280) to step 430 (S430) are a loop (repetition) for work in which the second worker fastens the four bolts RBn (n=1 to 4). Step 290 (S290): The second worker applies the tool RTn, to which the socket RTSn has been mounted, to the head section a of the bolt RB1 which has been temporarily tightened.

Step 300 (S300): The server performs image analysis on the tool RTn to which the socket RTSn is mounted to thereby determine whether the second worker has selected an appropriate tool RTn and socket RTSn. If an appropriate tool RTn and socket RTSn have not been selected, before S290 is returned to and an appropriate tool RTn is selected. In a case where an appropriate tool RTn and socket RTSn have been selected, the next step 300 is advanced to.

Step 310 (S310): The server grasps the virtual-space tool head position OITHn corresponding to the tool head position ORTHn within the tool reference plane TSP from an image of the tool RTn and the socket RTSn obtained by the camera 10.

Step 320 (S320): The server generates the direction vector NV in the normal direction from the tool head position ORTHn toward a space on the side of the tool reference plane TSP that is not visually recognized by the camera 10, and records coordinates (in, jn, kn) (n=1 to 4) for the direction vector NV.

Step 330 (S330): The server performs image analysis on the tool head RTHn and the socket RTSn to thereby generate a tool virtual body ITm in virtual space.

Step 340 (S340): The server causes the tool virtual body ITm to appear along a direction vector NV from the tool head position ORTHn for the start point of the direction vector NV.

Steps from step 340 (S340) to step 430 (S430) are a loop (repetition) for work in which the second worker fastens the four bolts RBn (n=1 to 4).

Step 350 (S350): The second worker applies the tool RTn, to which the socket RTSn has been mounted, to the head section a of the bolt RB1 which has been temporarily tightened, and starts fastening (final tightening) the bolt RB1, aiming at the fastening target torque Tr_Set.

Step 360 (S360): The server determines whether there is contact (interference) between the tool virtual body ITm and the bolt virtual body IB1, which corresponds one-to-one to the bolt RB1, in the virtual space. If the server determines that there is no contact between the tool virtual body ITm and the bolt virtual body IB1 in virtual space, the present processing returns to above S360, and if the server determines that there is contact between the tool virtual body ITm and the bolt virtual body IB1, the present processing advances to step 370.

Step 370 (S370): The server determines whether fastening torque is arising for the tool RTn. If the server determines that fastening torque is not occurring for the tool RTn, before S370 is returned to, and if the server determines that fastening torque is occurring, step 380 is advanced to.

Step 380 (S380): Because fastening torque is arising for the tool RTn (S370) under the condition (S360) that the tool virtual body ITm is in contact with the bolt virtual body IB1, the server determines that the bolt RB1, which corresponds one-to-one to the bolt virtual body IB1, has been fastened.

Figure 22:
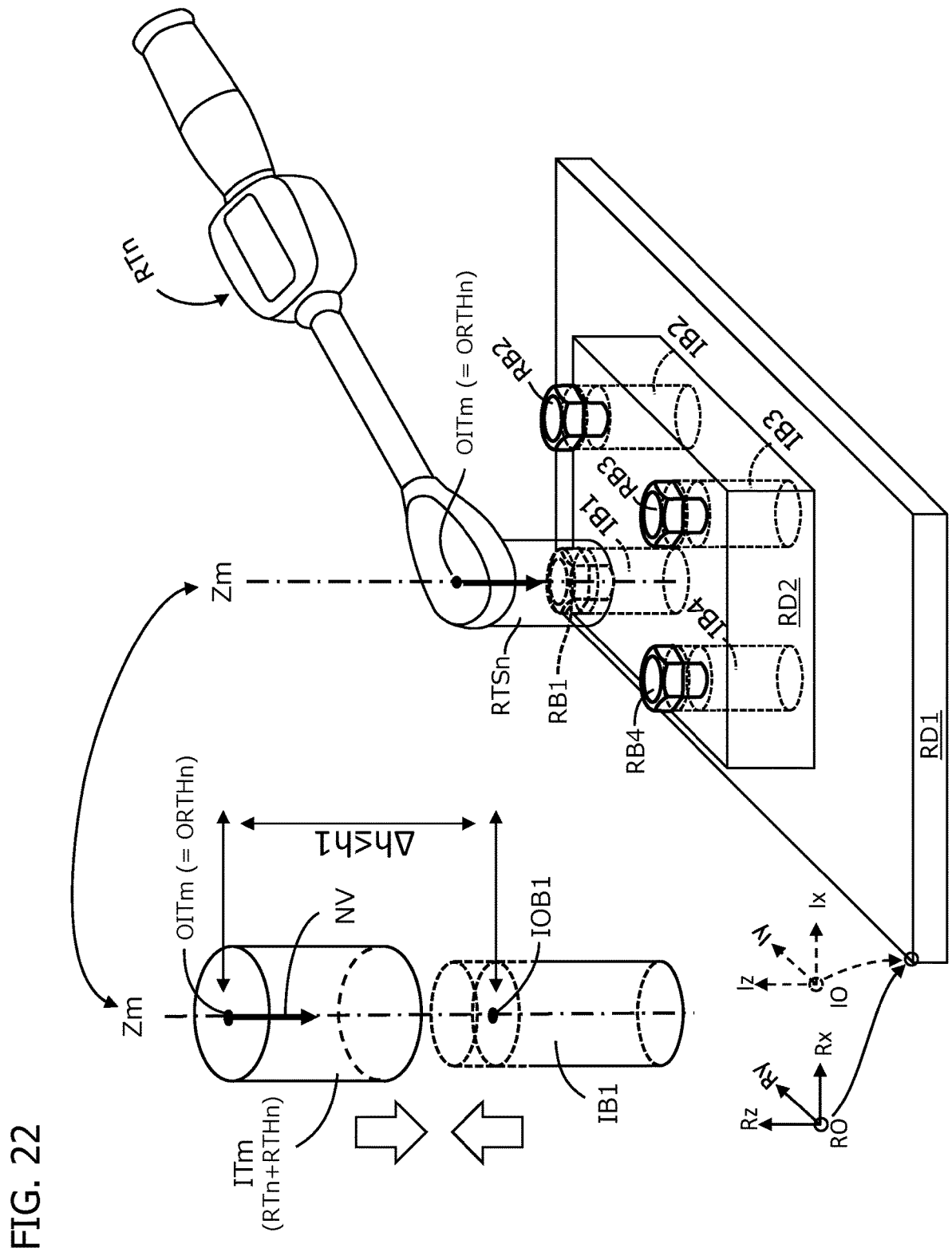
FIG. 22 is a schematic view that illustrates a procedure for, when the second worker fastens a bolt with a tool, specifying the bolt to be fastened by the tool in a virtual space, according to an embodiment of the present invention.

Next, with reference to FIG. 22, description is given in detail for the process for S350 to S380. FIG. 22 is a schematic view that illustrates a procedure for, when the second worker fastens a bolt with a tool, specifying the bolt to be fastened by the tool in a virtual space.

Firstly, the server analyzes an image captured by the camera 10 of the tool head RTHn which is provided with the socket RTSn to thereby grasp the tool head thickness dimension Din and the socket length dimension D2n, and then obtains the h1 dimension and the outer diameter OR. Afterwards, when the camera 10 captures the tool RTn, the server grasps the tool reference plane RTS for the tool RTn, and causes the tool virtual body ITm, which reflects the h1 dimension and the outer diameter OR, to appear in virtual space from a virtual tool head representative point OITHn (=tool virtual body representative point OITm) which is included in the tool reference plane RTS.

When the tool RTn to which the socket RTSn has been mounted is applied to the head section a of the bolt RB1 in real space, a state is entered in which the tool virtual body ITm is positioned above the bolt virtual body IB1 in virtual space but some of the two are overlapping (are in contact or interfering), and when the fastening complete torque Tr_rslt is observed by the tool RTn, a state is entered in which the tool virtual body ITm is reliably overlapping (is in contact or interfering) with the bolt virtual body IB1.

Note that, for a method of determining that the tool virtual body ITm is in contact (interfering, overlapping) with the bolt virtual body IB1 in virtual space, there is a plurality of methods indicated below.

(1) Determination in accordance with contact (interference, overlap) between the tool virtual body ITm and the bolt virtual body IB1.

(2) Determination in accordance with distance, in which the distance between the representative point OITm for the tool virtual body ITm and the representative point OIB1 for the bolt virtual body IB1 being smaller than a predetermined value (in this case, h1) is determined.

(3) Determination in accordance with distance and in accordance with orientation (direction) for the tool virtual body ITm and the bolt virtual body IB1, in which the determination in accordance with the distance includes a determination of whether the direction of the axis for the tool virtual body ITm does or does not match the direction of the axis for the bolt virtual body IB1 being added to the determination in (2).

Furthermore, the bolt RB1 which is in the real space and corresponds one-to-one to the bolt virtual body IB1 is defined by adding the fastening torque (torque in the range of Tr_B to Tr_Max in FIG. 6) being observed by the tool RTn under a condition where the tool virtual body ITm is in contact with the bolt virtual body IB1.

By this step, for example, when determination is made by only a contact determination, it is possible for the determination to be mistakenly made when the bolt RBn to which the tool RTn is first applied is fastened, such as a case in which, immediately after applying the tool RTn to the bolt RBn (n=one of 2 to 4), the second worker notices the error and reapplies the tool RTn to the bolt RB1. Accordingly, by using a torque generation condition (S370) together with a contact determination (360), it is possible to suppress mistakenly determining that fastening has been performed for a bolt RBn for which torque is not occurring.

Step 390 (S390): The server receives the fastening start torque Tr_B measured by the tool RTn, and records the timed at which the fastening start torque Tr_B has been received as a fastening start time t_B.

Step 400 (S400): The second worker confirms that a fastening complete torque Tr_rslt observed by the tool RTn is close to the target torque Tr_Set (for example, within a predetermined range that has been set in advance) and is between the fastening lower-limit torque Tr_Min and the fastening upper-limit torque Tr_Max, and then completes fastening for the bolt BR1.

Step 410 (S410): The server records the fastening complete torque Tr_rslt sent by the tool RTn and records the time at which the fastening complete torque Tr_rslt has been observed, as a fastening completion time t_E.

Step 420 (S420): The server records, in a data table (for example, a data table illustrated in FIG. 23), coordinates (x1, y1, z1) for a representative position IOB1 for a virtual bolt body IB1 corresponding to the bolt RB1 in real space, the direction vector NV (i1, j1, z1), the work datetime, and the fastening completion time (time the fastening complete torque Tr_rslt has been observed) for the bolt RB1.

Step 430 (S430): Repeat each step from S280 to S430 for only the number of loops (4 times) for the number of bolts RBn.

Step 440 (S440): By all of the empty fields in the data table in FIG. 23 being filled in, the server reconfirms that fastening work has completed for all of the bolts RBn (n=1 to 4) for which planned fastening work has been to be performed.

Step 450 (S450): After all of the bolts RBn (n=1 to 4) are fastened, the server captures and saves an image resulting from writing a work result (worker ID, work date, work time, fastening complete torque value Tr_rslt), work instruction document, etc.) near the bolts RBn (n=1 to 4) in the augmented reality space which includes fastening work target objects.

Figure 24:
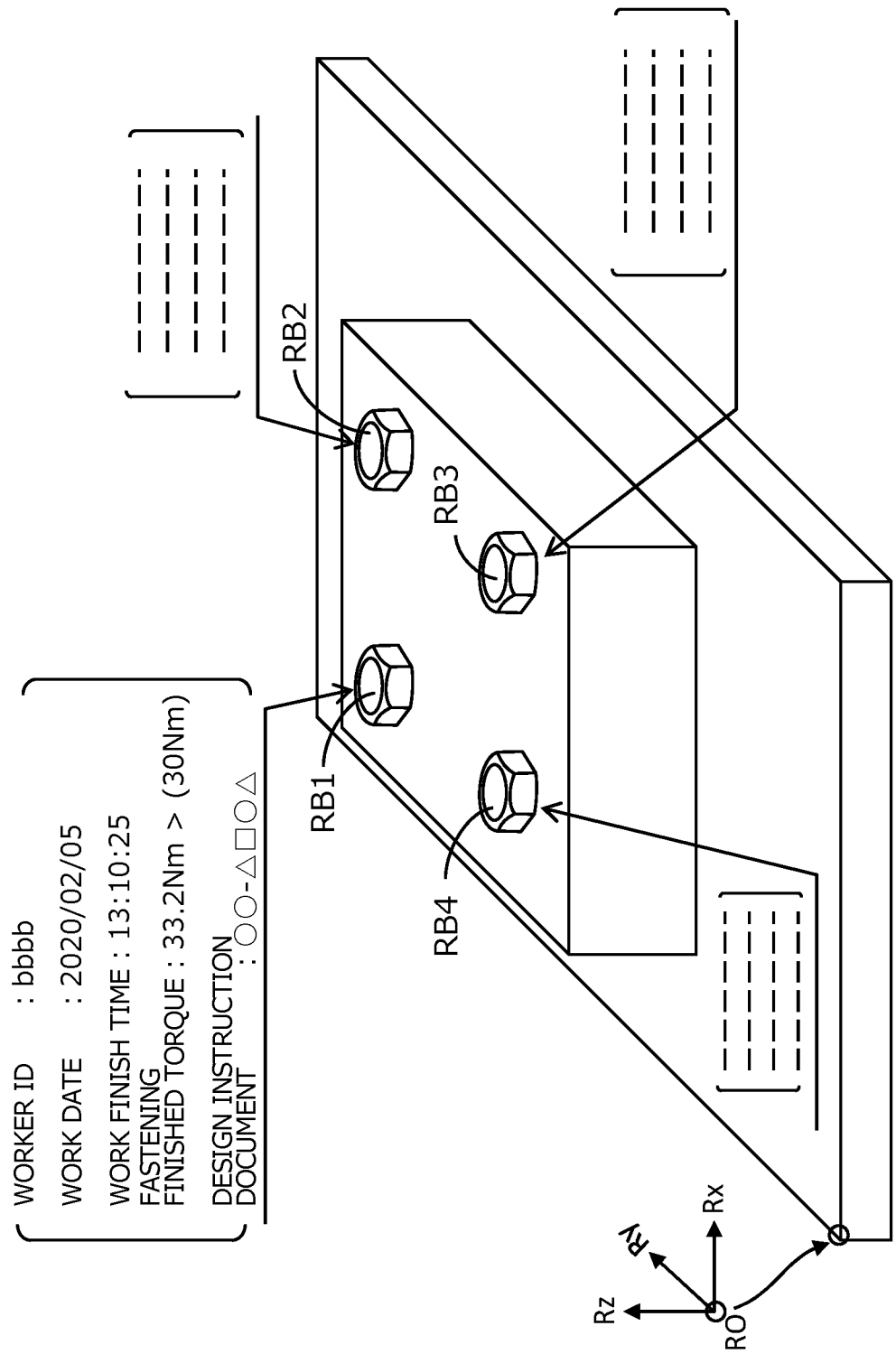
FIG. 24 is a schematic view resulting from capturing an image which is displayed in an augmented reality space after the second worker has fastened all bolts, the image including the fastened bolts and fastening work completion information displayed near these fastened bolts, according to an embodiment of the present invention.

By saving this captured image (for example, refer to FIG. 24), even in a case where some data in the data table illustrated in FIG. 23 in which the bolt fastening work by the second worker has been recorded is damaged or lost, it is possible to secure evidence (traceability) pertaining to bolt fastening work.

Step 460 (S460): The fastening work by the second worker ends.

By virtue of the embodiment described above, it is possible to provide a high-quality mechanical fastening work method that has a low operating cost and, by using augmented reality and ensuring traceability by recording content for mechanical fastening work performed by a certain worker, accelerates, for example, handover to another worker.

In addition, in the embodiment described above, description is given for a mechanical fastening method using augmented reality according to an embodiment of the present invention, but embodiments of the present invention are not limited to this, and may be carried out using, for example, a computer program, an apparatus, etc.

For example, functionality of an embodiment according to the present invention may also be realized by program code for software. In this case, a storage medium in which program code for implementing the functions of the present invention is recorded may be supplied to a device or a system, and a computing device (CPU, MPU, or the like) installed in the device or the system may read and implement the program code. By executing the program code read out from the storage medium by a computer in order to realize the functions of the above-described embodiments, the program code, the storage medium, and the computing device itself that are used to implement these functions constitute components of the present invention.

A storage medium for recording the program code includes, for example, a floppy disk, a CD-ROM, a DVD-ROM, a hard disk, an optical disk, a magneto-optical disk, a CD-R, magnetic tapes, non-volatile memory cards, ROM, etc.

Figure 25:
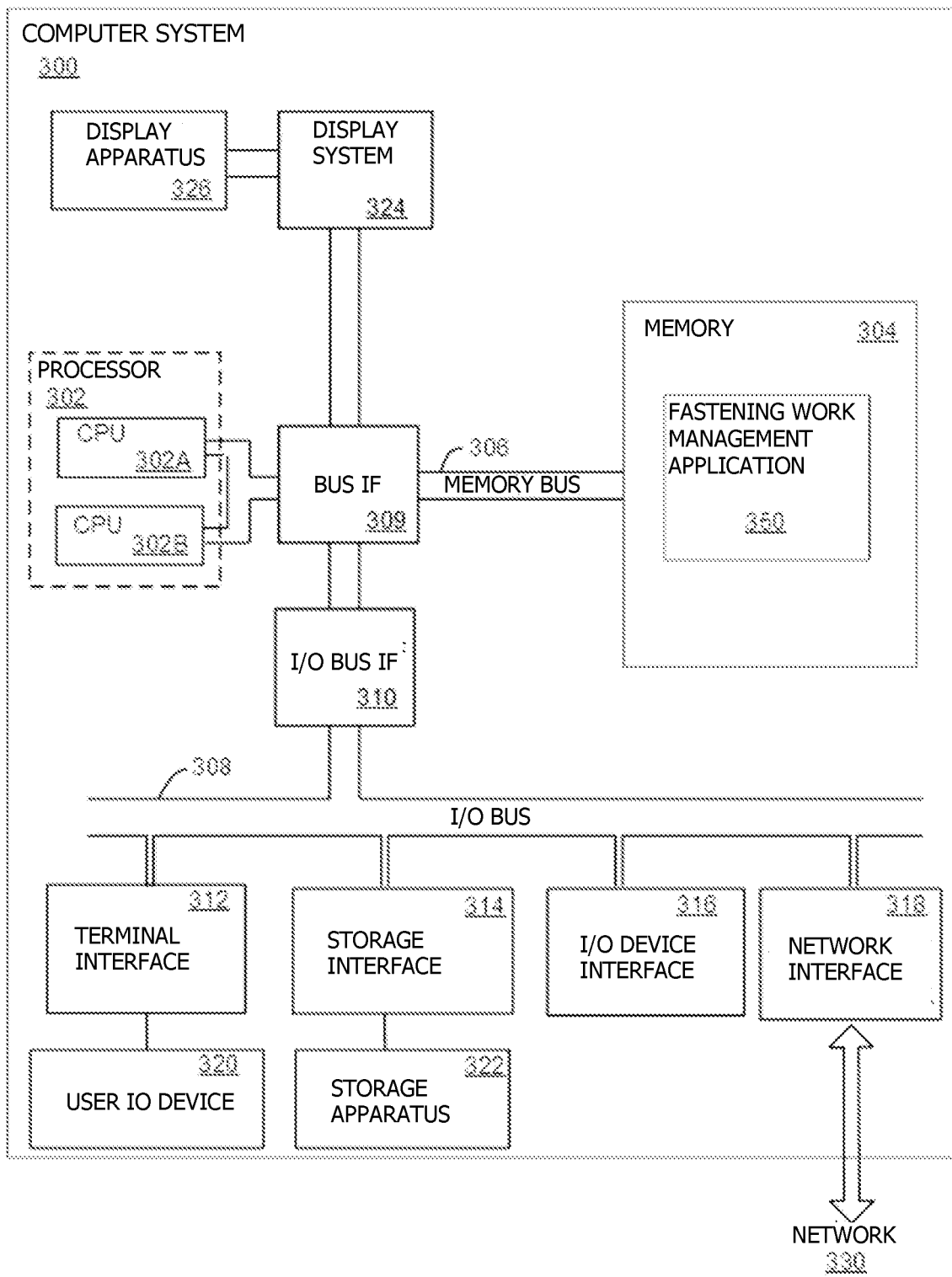
FIG. 25 is a block view of a computer system configured to perform functionality in a mechanical fastening work method using augmented reality, according to an embodiment of the present invention.

Next, with reference to FIG. 25, description is given regarding a computer system for working an embodiment of the present invention. FIG. 25 is a block view of a computer system configured to perform functionality in a mechanical fastening work method using augmented reality, which is described above.

Major components of a computer system 300 include one or more processors 302, a memory 304, a terminal interface 312, a storage interface 314, an I/O (input/output) device interface 316, and a network interface 318. These components may be reciprocally connected via a memory bus 306, an I/O bus 308, a bus interface unit 309, and an I/O bus interface unit 310.

The computer system 300 may include one or a plurality of general-purpose programmable central processing units (CPUs) 302A and 302B which are named generically as a processor 302. In a certain embodiment, the computer system 300 may be provided with a plurality of processors, and in a different embodiment, the computer system 300 may be a system with a single CPU. Each processor 302 may execute a command stored in the memory 304, and include an onboard cache.

In a certain embodiment, the memory 304 may include a random-access semiconductor memory, a storage apparatus, or a storage medium (one of volatile or non-volatile) for storing data and programs. The memory 304 may store all or some of programs, modules, and data structures for carrying out functionality described in the present specification. For example, the memory 304 may store a fastening work management application 350. In a certain embodiment, the fastening work management application 350 may include commands or statements for executing a later-described function on the processor 302.

In a certain embodiment, in place of a processor-based system or in addition to a processor-based system, the fastening work management application 350 may be performed by hardware via a semiconductor device, a chip, logic gate, circuit, circuit card, and/or another physical hardware device. In a certain embodiment, the fastening work management application 350 may include data that is not a command or a statement. In a certain embodiment, a camera, a sensor, or another data input device (not illustrated) may be provided so as to directly communicate with the bus interface unit 309, the processor 302, or another item of hardware in the computer system 300.

The computer system 300 may include the bus interface unit 309 which performs communication between the processor 302, the memory 304, a display system 324, and the I/O bus interface unit 310. The I/O bus interface unit 310 may be connected to the I/O bus 308 which is for transferring data between various I/O units. The I/O bus interface unit 310 may, via the I/O bus 308, communicate with a plurality of I/O interface units 312, 314, 316, and 318, which are each known as an I/O processor (IOP) or an I/O adapter (IOA).

The display system 324 may include a display controller, a display memory, or both of these. The display controller can provide data for video, audio or both of these to a display apparatus 326. In addition, the computer system 300 may include one or a plurality of devices such as sensors which are configured to collect data and provide this data to the processor 302.

For example, the computer system 300 may include, for example, a biometric sensor that collects, heart rate data, stress level data, etc., an environment sensor that collects humidity data, temperature data, pressure data, etc., or a motion sensor that collects acceleration data, motion data, etc. Sensors of types other than these can be used. The display system 324 may be connected to the display apparatus 326 which is an independent display screen, television, tablet, portable device, etc.

An I/O interface unit is provided with functionality for communicating with various storages or I/O devices. For example, a terminal interface unit 312 can be attached to a user I/O device 320 that is a user output device such as a video display apparatus or a speaker/television, or a user input device such as a keyboard, mouse, key pad, touchpad, trackball, button, light pen, or other pointing device. A user may operate a user input device using a user interface to thereby input input data or an instruction to the user I/O device 320 and the computer system 300, and receive output data from the computer system 300. A user interface, for example, may, via the user I/O device 320, display to a display apparatus, perform reproduction using a speaker, or print via a printer.

It is possible to attach one or a plurality of disk drives or direct-access storage apparatuses 322 (normally, a magnetic disk drive storage apparatus, but may be a disk drive array configured to be seen as a single disk drive, or another storage apparatus) to the storage interface 314. In a certain embodiment, a storage apparatus 322 may be implemented as any secondary storage apparatus. It may be that content in the memory 304 is stored in a storage apparatus 322, and read out from the storage apparatus 322 if necessary. The I/O device interface 316 may provide an interface for another I/O device such as a printer or a fax machine. The network interface 318 may provide a communication route such that the computer system 300 and another device can communicate with each other. This communication route may be a network 330, for example.

In a certain embodiment, the computer system 300 may be a device that does not have a direct user interface, such as a multi-user mainframe computer system, a single-user system, or a server computer and receives a request from another computer system (a client). In another embodiment, the computer system 300 may be a desktop computer, a portable computer, a laptop computer, a tablet computer, a pocket computer, a telephone, a smartphone, or any other appropriate electronic device.

By virtue of the above-described mechanical fastening work method using augmented reality, it is possible to provide mechanical fastening work method that has a low operating cost and is high quality, does not require adding an identification mark such as an RFIC tag to a fastening part or transmitting or receiving data between the fastening part and a fastening tool, and uses augmented reality such that a certain worker records content for performed mechanical fastening work to ensure traceability, whereby handover to another worker, for example, is accelerated.

REFERENCE SIGNS LIST

R0: Real-space origin
IO: Virtual-space origin
RD1: Base
RD2: Component
RPn: Through hole
Ron: Threaded hole
RTn: Tool (ratchet wrench)

RTEn: Tool handle section
RTHn: Tool head
ORTHn: Tool head position (coordinates)
D1n: Head thickness dimension
RTT: Communication display unit
RTSn: Socket
D2n: Socket length dimension
OR: Socket outer diameter
RBn: Bolt
ORBn: Bolt position (coordinates)
a: Head section
b: Cylindrical section
c: Threaded section
t_B: Fastening start time
Tr_B: Fastening start torque
Tr_Min: Fastening lower-limit torque
Tr_Set: Fastening target torque
Tr_Max: Fastening upper-limit torque
Tr_rslt: Fastening complete torque
t_rslt: Fastening completion time
TSP: Tool reference plane
ITm: Tool virtual body (cylinder)
OITm: Tool virtual body representative point (coordinates)
IBn: Bolt virtual body (cylinder)
OIBn: Bolt virtual body representative point (coordinates)
NV: (Unit) direction vector
5: Network
7: Wearable apparatus (headgear)
10: Camera
12: Augmented reality server
14: Transmissive screen (HMD)
26: Network server

The invention claimed is:

1. A mechanical fastening work method, by a first worker, using an augmented reality space generated by overlapping a virtual space on real space,
the real space including a mechanical fastening part and a tool put on the mechanical fastening part,
the virtual space including a mechanical fastening part virtual body simulating the mechanical fastening part and a tool virtual body simulating the tool virtual body,
in the augmented reality space, the mechanical fastening part corresponding one-to-one to the mechanical fastening part virtual body and the tool corresponding one-to-one with the tool virtual body,
an augmented reality system that generates the augmented reality space having:
a camera that captures the real space,
a server that is connected to the camera and is configured to analyze an image captured by the camera and generate an augmented reality space, and
the tool that obtains tightening/loosening information observed at a time of tightening or loosening for the mechanical fastening part and transmits and receives the tightening/loosening information to and from the server,
the mechanical fastening work method comprising:
a step of defining the mechanical fastening part virtual body that corresponds one-to-one to the mechanical fastening part virtual body, and having the defined mechanical fastening part virtual body appear in the virtual space, when the tool has detected the tightening/loosening information for tightening or loosening the mechanical fastening part;
a step of creating a first work table that is generated on a basis of fastening work by the first worker and has position information for the mechanical fastening part and the tightening/loosening information; and
projecting the position information held in the first work table into the augmented reality space, and teaching work content by the first worker to a second worker.

2. The mechanical fastening work method using augmented reality according to claim 1,
wherein the tool is configured by:
a handle section that a worker grasps, a tool head section that is connected to the handle section, and
a socket section mounted to the tool head section, and
wherein the server;
performs image analysis on the tool head section obtained by the camera, generates a tool reference plane that includes a tool representative point that represents a position for the tool head section, defines, in a direction from the tool reference plane in which the camera visually recognizes the tool, a direction vector having the tool representative point as a start point,
specifies a tool dimension that represents the tool head section and the socket section,
generates the tool virtual body that has the tool dimension following the direction vector from the tool representative point, and makes the tool virtual body appear in the virtual space.

3. The mechanical fastening work method using augmented reality according to claim 2,
wherein the mechanical fastening part virtual body simulates a bolt having an apex section, an axial section that is connected to the apex section, and a threaded section that is connected to the axial section, and has a mechanical fastening part virtual body representative point at an intersection point between a connection surface, the connection surface being between the apex section and the axial section, and an axis for the axial section, and
wherein the server generates the mechanical fastening part virtual body and makes the mechanical fastening part virtual body appear in the virtual space in an aspect in which the mechanical fastening part virtual body follows the direction vector, and the mechanical fastening part virtual body representative point is disposed at a position separated from the tool representative point by only the tool dimension.

4. The mechanical fastening work method using augmented reality according to claim 3,
wherein the tightening/loosening information is a fastening complete torque value between a fastening lower-limit torque value and a fastening upper-limit torque value.

5. The mechanical fastening work method using augmented reality according to claim 2,
wherein the server emits a warning when the server has detected that a rate of increase in observed fastening torque for the mechanical fastening part has exceeded a rate of increase for fastening torque, the rate of increase having been prescribed in advance.

6. The mechanical fastening work method using augmented reality according to claim 4,
wherein the first work table has:
the fastening lower-limit torque value, and
the fastening upper-limit torque value, and the method further comprises:
a step of, by the server, adding, to the first work table:
coordinates for the mechanical fastening part virtual body representative point,
coordinates for the direction vector,
the fastening complete torque value, and
time information pertaining to a time of tightening or loosening for the mechanical fastening part; and
verifying the number of mechanical fastening parts, when the tightening/loosening information is detected.

7. The mechanical fastening work method using augmented reality according to claim 6, the method further comprising:
a step of, by the server, obtaining and saving an image that displays, in the augmented reality space and near the mechanical fastening part, the fastening complete torque value, and the time information.

8. The mechanical fastening work method using augmented reality according to claim 6,
wherein the server;
teaches a position for the mechanical fastening part and a tightening/loosening order to a second worker by creating a second work table resulting from removing the fastening torque information and the time information from the first work table, and
on a basis of the position information for the mechanical fastening part virtual body, the position information being written in the first work table, displaying the mechanical fastening part virtual body in the augmented reality space.

9. The mechanical fastening work method using augmented reality according to claim 8,
wherein the server, in the augmented reality space, when the second worker tightens or loosens the mechanical fastening part with the tool, uses both an interference determination for determining that the tool virtual body interferes with the mechanical fastening part virtual body and the tightening/loosening information to define that the tightened or loosened mechanical fastening part corresponds one-to-one to the mechanical fastening part virtual body.

10. The mechanical fastening work method using augmented reality according to claim 9,
wherein the interference determination is a determination of overlapping between the tool virtual body and the mechanical fastening part virtual body in the virtual space.

11. The mechanical fastening work method using augmented reality according to claim 9,
wherein the interference determination is determined on a basis of a distance between a tool virtual body representative point and the mechanical fastening part virtual body representative point in the virtual space.

12. The mechanical fastening work method using augmented reality according to claim 8,
wherein the server;
adds, to the second work table, the fastening complete torque value, and
the time information pertaining to a time of tightening or loosening for the mechanical fastening part, and
verifies the number.

13. The mechanical fastening work method using augmented reality according to claim 12,
wherein the server obtains and saves an image that displays, in the augmented reality space and near the mechanical fastening part, the fastening complete torque value, and the time information.

* * * * *